United States Patent
Ersan et al.

(10) Patent No.: US 9,382,007 B2
(45) Date of Patent: Jul. 5, 2016

(54) AIRCRAFT SEAT ARRANGEMENT INCLUDING TABLE

(75) Inventors: Ali Ersan, London (GB); Daniel Clucas, London (GB)

(73) Assignee: Zodiac Seats UK Limited, Cwmbran (GB)

( * ) Notice: Subject to any disclaimer, the term of this patent is extended or adjusted under 35 U.S.C. 154(b) by 220 days.

(21) Appl. No.: 14/002,122

(22) PCT Filed: Mar. 30, 2012

(86) PCT No.: PCT/GB2012/050715
§ 371 (c)(1),
(2), (4) Date: Feb. 14, 2014

(87) PCT Pub. No.: WO2012/131384
PCT Pub. Date: Oct. 4, 2012

(65) Prior Publication Data
US 2014/0145477 A1    May 29, 2014

(30) Foreign Application Priority Data

Apr. 1, 2011  (GB) ................................. 1105595.1

(51) Int. Cl.
*B64D 11/06*   (2006.01)
*B60N 2/01*    (2006.01)
*B60N 2/04*    (2006.01)

(52) U.S. Cl.
CPC ............ *B64D 11/06* (2013.01); *B64D 11/0601* (2014.12); *B64D 11/064* (2014.12); *B64D 11/0606* (2014.12); *B64D 11/0638* (2014.12); *B64D 11/0641* (2014.12)

(58) Field of Classification Search
CPC .. B64D 11/06; B64D 11/0638; B64D 11/064; B64D 11/0601; B64D 11/0641; B64D 11/0606
USPC ................. 297/147, 248, 243, 135, 173, 232; 244/118.6
See application file for complete search history.

(56) References Cited

U.S. PATENT DOCUMENTS

| | | | | |
|---|---|---|---|---|
| 2,460,148 A | * | 1/1949 | Roth ..................... | A47C 16/025 108/1 |
| 2,493,084 A | * | 1/1950 | Pharo ....................... | A47C 4/14 297/135 |

(Continued)

FOREIGN PATENT DOCUMENTS

| | | |
|---|---|---|
| DE | 19822694 | 11/1999 |
| EP | 1405758 | 9/2006 |

(Continued)

OTHER PUBLICATIONS

International Search Report and Written Opinion dated Sep. 27, 2012 in Application No. PCT/GB2012/050715.

(Continued)

*Primary Examiner* — Milton Nelson, Jr.
(74) *Attorney, Agent, or Firm* — Kilpatrick Townsend & Stockton LLP; Dean W. Russell; Davidson G. Lucas

(57) ABSTRACT

An aircraft seat arrangement includes first and second seats and first and second consoles, the first console being in front of the first seat and adjacent to the second seat, such that the first and second consoles and the first and second seats are in a staggered arrangement. A table is housed by the first console. The table is arranged for movement to a stowed position, in which the table is inserted within said first console. The table is arranged for, optionally horizontal, movement to a deployed position, in which the table is positioned aft of the first console so as to be suitable for use by a passenger seated in the first seat. The table may be arranged to present different areas of useable table surface.

20 Claims, 19 Drawing Sheets

(56) References Cited

U.S. PATENT DOCUMENTS

| | | | |
|---|---|---|---|
| 5,086,711 A * | 2/1992 | Matthews | A47B 3/02 108/119 |
| 5,660,432 A * | 8/1997 | Davis | A47D 1/008 297/135 |
| 5,954,401 A | 9/1999 | Koch et al. | |
| 7,178,871 B1 | 2/2007 | Round et al. | |
| 2001/0000639 A1 | 5/2001 | Park et al. | |
| 2005/0087650 A1 | 4/2005 | Quan et al. | |
| 2005/0258672 A1 | 11/2005 | Schweizer | |
| 2007/0241232 A1 | 10/2007 | Thompson | |
| 2008/0092784 A1 | 4/2008 | Merensky | |
| 2010/0065684 A1 | 3/2010 | Ruiter et al. | |
| 2010/0187357 A1 | 7/2010 | Funke et al. | |
| 2011/0156450 A1 | 6/2011 | Collins et al. | |
| 2011/0169306 A1 * | 7/2011 | Thompson | 297/147 |
| 2011/0210204 A1 | 9/2011 | Collins et al. | |

FOREIGN PATENT DOCUMENTS

| | | |
|---|---|---|
| FR | 2935684 A1 | 3/2010 |
| GB | 907472 A | 10/1962 |
| GB | 2331237 | 5/1999 |
| JP | 2000142587 | 5/2000 |
| JP | 2001253283 | 9/2001 |
| JP | 2002527288 | 8/2002 |
| JP | 2005289080 | 10/2005 |
| JP | 2009513419 | 4/2009 |
| JP | 2010052393 | 3/2010 |
| WO | 0021831 A2 | 4/2000 |
| WO | 2008031506 | 3/2008 |
| WO | 2010029223 | 3/2010 |
| WO | 2011030006 | 3/2011 |

OTHER PUBLICATIONS

Search Report dated Nov. 28, 2011 in Application No. GB1105595.1.
Search Report dated Jul. 22, 2011 in Application No. GB1105595.1.
Picture and Web Link, Author Unknown, "ANA Business Class", <URL:http://www.youtube.com/watch?v=_RE4ht3FthQ, 1 page. Available to applicants no later than Dec. 2, 2013; the depicted is believed, but not conceded, by applicants to have entered into service on All Nippon Airways (ANA) of Japan in 2009.
Japanese Patent Application No. 2014-501723, Office Action (and English translation) dated Feb. 9, 2016.

* cited by examiner

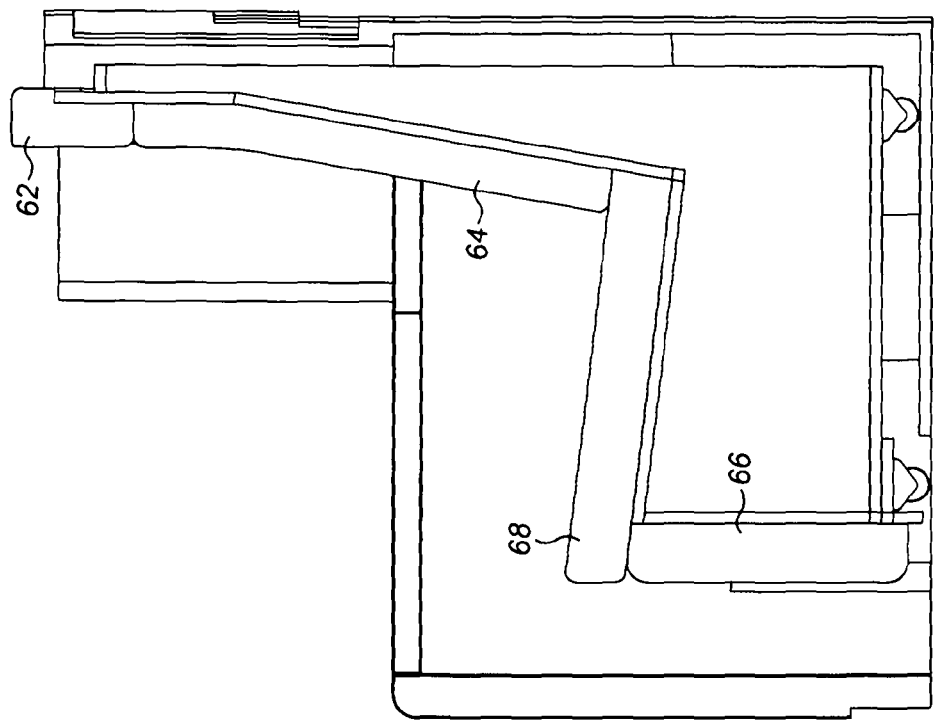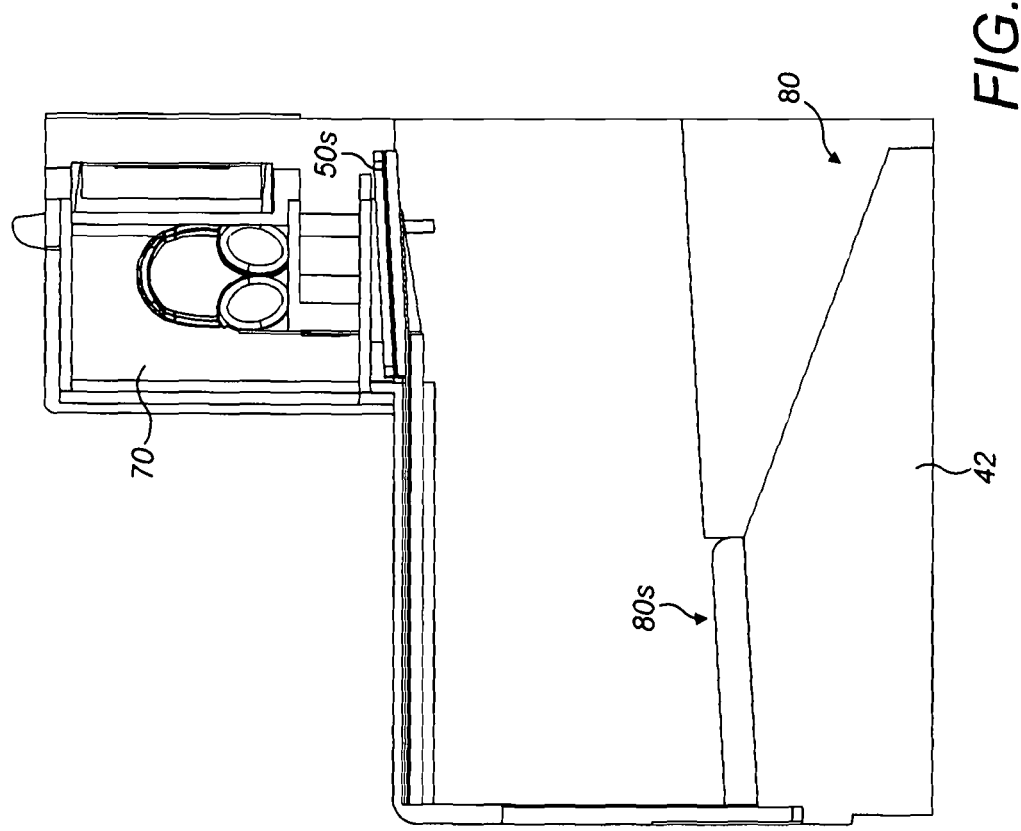
FIG. 4

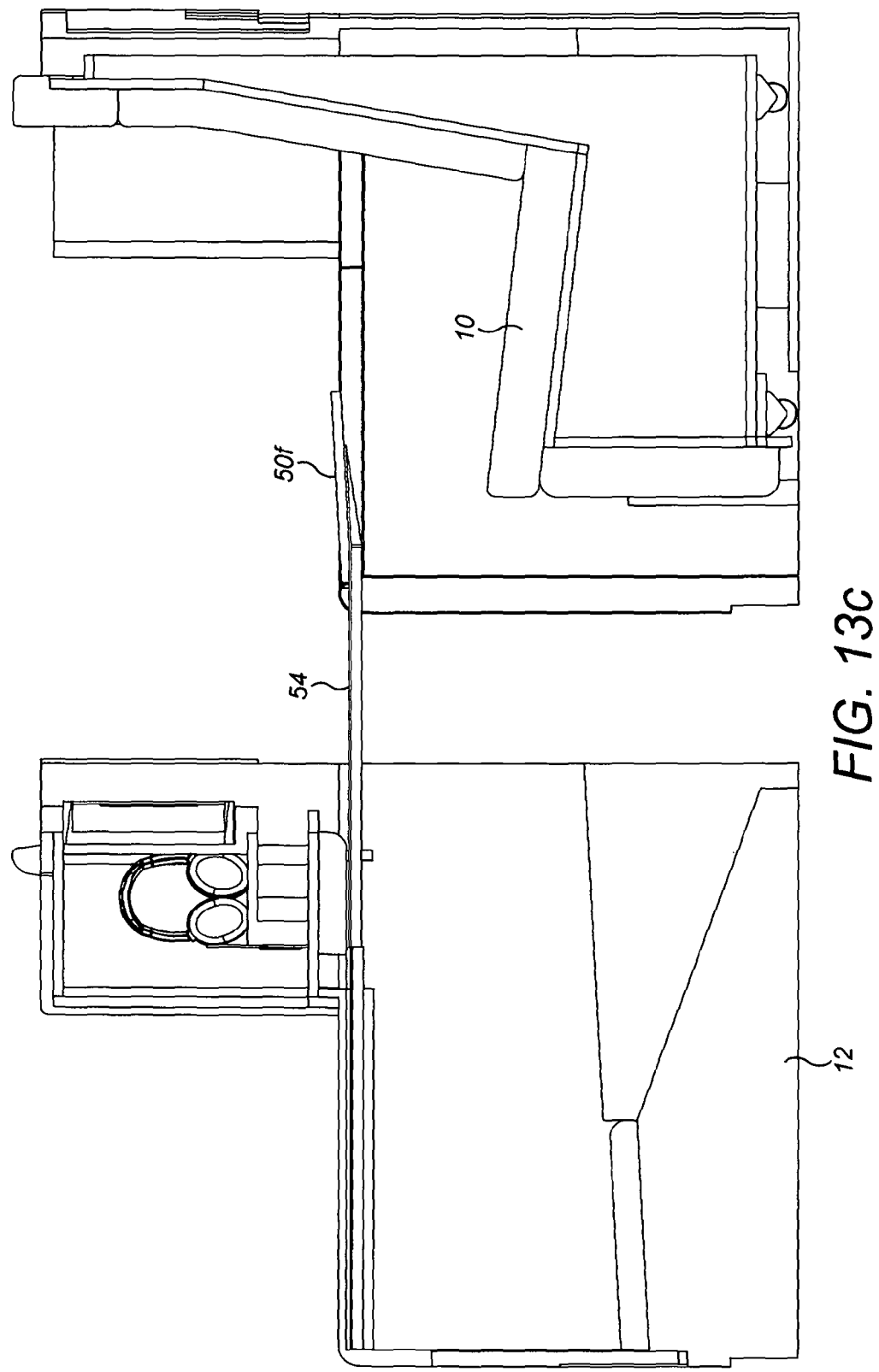

AIRCRAFT SEAT ARRANGEMENT INCLUDING TABLE

CROSS REFERENCE TO RELATED APPLICATIONS

This application is the U.S. national phase of International Application No. PCT/GB2012/050715 filed on Mar. 30, 2012, which application was published in English by the World Intellectual Property Organization on Oct. 4, 2012 as Publication No. WO 2012/131384 A2, and claims priority to Great Britain Patent Application No. 1105595.1 filed on Apr. 1, 2011, the contents of both of which are incorporated herein by reference.

BACKGROUND OF THE INVENTION

The present invention concerns an aircraft seat arrangement. More particularly, but not exclusively, this invention concerns an aircraft seat arrangement including a table for use by a seated passenger. The invention also concerns methods of stowing, deploying and/or using such a table.

Seat arrangements of the prior art typically include a table of some form for use by a seated passenger. Economy seats typically have a table hingedly fixed to a seat for use by the passenger seated in the seat behind. The table may be swung, by rotational movement, from a stowed position in which the table is positioned substantially flat against the back of the seat, to a deployed position in which the table is positioned in a horizontal position so as to present an area of useable table space. Such an arrangement is typically unsuitable for use in a premium-class seat (such as business or first class seats), where the pitch of the seats is such that mounting a hinged table on the seat in front of, or the structure in front of, the seated passenger would not satisfy the ergonomic requirements of the position of the table when deployed relative to the position of the passenger when seated; the area of useable table space table would be too far away from the passenger for easy use. Also, there may be provided an in-flight entertainment (IFE) monitor in or on the back of a seat for viewing by the passenger seated in the seat behind. There is then competition for space and position as between the monitor and the table and its deployment mechanism. A solution to the problem is to provide a table that deploys from a position adjacent to the seat, for example from within an arm-rest. Such tables typically have a complicated mechanism associated with the table to enable the table to be lifted out of the arm-rest and then rotated into a usable position. The tables typically fold out, but do not provide any great flexibility in use as a result of their foldable nature.

The present invention seeks to mitigate the above-mentioned problems. Alternatively or additionally, the present invention seeks to provide an improved table for an aircraft or method of using a table in an aircraft. Alternatively or additionally, the present invention seeks to provide an improved aircraft seat assembly including a table.

SUMMARY OF THE INVENTION

The present invention provides, according to a first aspect, an aircraft seat arrangement comprising
a first seat,
a structure located forward of the first seat
a table housed by said structure, wherein
the table is arranged for movement to a stowed position, in which the table is inserted within said structure, and
the table is arranged for movement to a deployed position, in which the table is positioned for use by a passenger seated in the first seat.

As a result of moving the table to its stowed position by means of inserting it within said structure in front of the seat, better use can be made of the space available and a simpler deployment mechanism can be employed.

The structure may be a console. The structure may be a monument. The structure may comprise a foot-well. The table when stowed may be substantially horizontal.

The invention has particular application in the case where the seat arrangement comprises a first row in which the first seat is located together with a console and a second row in which the second seat is located together with a further console. Each console may provide function to more than one seat (for example by providing function to the adjacent seat as well as accommodating a table for use by a passenger seated in the seat behind). The first and second consoles and the first and second seats may be in a staggered arrangement. By providing a table which is inserted into the console, and which may deploy out from a console in a similar, preferably horizontal, manner, the console can provide multiple functions to both a seat adjacent to the console and to a seat aft of the console.

The table may be so arranged that the movement of the table from the stowed position to the deployed position is limited to movement in a substantially horizontal direction. Whilst the movement could include a component of rotational movement, for example of a type such that, on deployment, the table is swung out within a horizontal plane, the movement is preferably predominantly in the form of translational movement.

Any suitable deployment mechanism may be employed to effect movement of the table from the stowed position to the deployed position. The deployment mechanism may comprise one or more rails for guiding the movement. The deployment mechanism may comprise one or more grooves for guiding the movement. The deployment mechanism may comprise one or more sliders for guiding the movement. The deployment mechanism may comprise one or more runners for guiding the movement. The mechanism may be provided along the centre line (in the fore-and-aft direction). Alternatively, or additionally, the mechanism may be provided such that respective portions of the mechanism are disposed at laterally separated regions, for example in the form of a pair of laterally spaced apart elongate deployment means. The deployment mechanism may comprise a hydraulic ram.

The table may include a deployment mechanism, such as for example any of those described above.

The structure may comprise an aperture or recess, which for example defines a passageway or is defined by a passageway, through which the table moves when being inserted within said structure.

The aperture or recess when in the form of a recess may be open on at least one side. For example, the recess may be in the form of a channel having an upper surface, side surfaces, but no bottom surface. It will therefore be appreciated that the underside of the table, when inserted within said structure, may be exposed to a free-space defined within and by said structure. When the structure is in the form of a console, the free-space may for example extend to a foot-well in the console.

The aperture or recess when in the form of an aperture, may for example be a slot-shaped aperture. The aperture or recess may have a shape that is complementary to the shape of the space swept by the table as it moves between its stowed and deployed positions. Thus, the aperture or recess is preferably of a size that is comparable and not significantly larger than that needed to accommodate the space swept by the table as it moves between its stowed and deployed positions. As a result of the table being arranged for insertion into the structure, a part of the table may be directly adjacent to the aperture or recess, for example when the table is stowed.

The structure may comprise a monitor for viewing by a passenger seated in the first seat. The table may be arranged to be inserted within said structure at a position beneath the monitor. The structure may comprise a stowage space vertically located between the monitor and the table when stowed. The monitor may be an IFE monitor.

The structure may include a foot-well. The first seat may be convertible into a bed-mode. In the bed-mode, the feet of a passenger lying on the first seat may extend into the foot-well.

The size of the passenger referred to herein may be defined by reference to a notional man having a size at the 95th percentile (a 95% man), of the population of 40 year-old white or black American males in the year 2000.

The foot-well may include an upper surface which in use acts as an extension to the bed surface defined by the upper surface of the first seat when in its bed-mode.

The foot-well may include, or be usable for, storage space by a passenger.

The seat arrangement may include a second seat. A first console may be located adjacent to the second seat. The first seat and said structure need not be provided in a form in which they are physically connected before installation on an aircraft. The first console may define said structure. The second seat and the first console may however be provided in a form in which they are physically connected, thereby easing correct and efficient installation on an aircraft. It will therefore be appreciated that the aircraft seat arrangement need only be an arrangement in the sense that the seat, the structure and the table are provided together. The aircraft seat arrangement may be in the form of an aircraft seat assembly.

The seat arrangement may include a second console adjacent to the first seat. The second console may be directly aft of the second seat. The consoles and the seats of the seat arrangement may be in a staggered, or alternating, arrangement.

The seat arrangement may include a third seat and a third console. The seat arrangement may include a fourth seat and a fourth console. There may be a first row formed by the first seat, the third seat, the second console, and (optionally if provided) the fourth console. There may be a second row formed by the second seat, the first console and the third console, and (optionally if provided) the fourth seat. The second row may be directly in front of the first row. Each of the first console and the third console may have a foot-well. The first seat may be convertible into a bed-mode in which the feet of a passenger lying on the first seat extend into the foot-well of the first console. The third seat may also be convertible into a bed-mode in which the feet of a passenger lying on the third seat extend into the foot-well of the third console. Preferably, the foot-well of the first console has a width that is substantially identical to the corresponding width of the foot-well of the third console.

It will be appreciated that the first console may have a shape that is substantially identical to the shape of the foot-well of the third console, in which case the width of the foot-wells will be identical whichever corresponding widths are compared. If however the foot-wells are not identical in shape, it may be possible to find a width of one foot-well that is different from a corresponding width of the other foot-well, whilst also finding another pair of widths that are identical. Whether or not the widths of a pair of foot-wells are deemed identical may therefore depend on which widths are compared. The widths of the foot-wells that are compared may be the maximum width of the foot-well. The widths of the foot-wells that are compared may be the minimum width of the foot-well along the widest 75% of the length of the foot-well. The widths of the foot-wells that are compared may be the average width of the foot-well. The average width of the foot-well of a console may be deemed to be the median width. Alternatively, the average width of the foot-well of a console may be deemed to be that width which would result from: notionally dividing the foot-well lengthwise into 100 sections of equal length, measuring the maximum width of each foot-well section, arranging the 100 width measurements in size order, and choosing the $50^{th}$ measurement.

The present invention has particular application in classes of seat that are superior to economy class. Economy seat arrangements typically have a shorter pitch and economy seats are typically not required to have a bed-mode.

The pitch distance between the first and second seats may be greater than 100 cm. The pitch distance between the first and second seats is preferably greater than 900 mm (about 35 inches). In an embodiment below, the pitch distance is about 45 inches (which is a pitch that is greater than 1000 mm).

It will be understood that the "pitch distance" between a first seat positioned aft of a second seat means the distance between a point (for example the foremost point when the seat is in its fully upright position ready for take-off or landing) on the second seat and the corresponding point on the first seat, as measured in the longitudinal direction of the aircraft (i.e. the longitudinal component of the distance between the two points). The pitch distance may be measured once the first and second seats are installed on an aircraft, or are otherwise physically connected to each other ready for installation on an aircraft.

When installed on an aircraft, the first seat may lie on a first notional line which passes through the centre of the seat and which is parallel to the longitudinal line of the fuselage of the aircraft, and the second seat may lie on a second notional line which passes through the centre of the second seat and which is parallel to the first notional line. The separation between the first and second notional lines may be greater than 600 mm (about 24 inches). The separation between the first and second notional lines may be greater than 900 mm (about 35 inches). The first seat will typically have a back cushion, a seat pan cushion, and a cushioned leg rest portion. The seat pan cushion may have a maximum width that is greater than 450 mm and preferably greater than 470 mm. The seat pan cushion may have a maximum width that is greater than 500 mm. The separation between the first and second notional lines less the maximum width of the seat pan cushion may be greater than 125 mm (about 5 inches). The separation between the first and second notional lines less the maximum width of the seat pan cushion may be greater than 250 mm.

The aircraft seat arrangement may be provided as part of a larger aircraft seat set including one or more further, similarly arranged, aircraft seat arrangements.

The first console may include a stowage space for use by a passenger seated in the second seat. The stowage space may be a shallow space having a length and a width, the length being arranged vertically and the width being arranged horizontally. The storage space may be positioned at the fore end of the first console. The storage space may be so arranged that its width is parallel to the width of the second seat. Alternatively, or additionally, the stowage space may be in the form of a cupboard having a base that is positioned above the upper surface of the seat pan cushion of the second seat. The cupboard may be provided with a door, the storage space in the cupboard being located aft of the drawer. When the door of the cupboard is closed, the fore face of the cupboard, which may be defined by the door, may extend forward of the foremost point on the seat back cushion of the second seat.

The second seat may be configured so as to be suitable for use as an aisle seat. The first console may include a first arm rest portion, which is located to one side of the second seat for use by a passenger seated in the second seat. The aircraft seat arrangement may also include a second arm rest portion on the other side of the second seat for use by the passenger. The console may include a step between the first arm rest portion and the rest of the upper surface of the console. In such a case, the height of the first arm rest may be substantially the same as the height of the second arm rest. Alternatively, the console may include a central upper surface which is substantially the same height as the height of the first arm rest, and the height of the first arm rest is significantly higher than the height of the second arm rest. Other configurations of arm-rest heights are of course within the scope of the present invention.

The table may be arranged for movement to a first deployed position, in which a first portion of the table is accommodated within the structure. In the first deployed position, a second portion of the table may be positioned aft of the structure. In the first deployed position the table may provide a usable table space, having a first area, for use by a passenger seated in the first seat. The first area may be directly adjacent to the structure. The first area may be suitable for holding one or more drinks, but may have a maximum dimension that is less than 300 mm. The area of the first area may be less than 70,000 mm$^2$, and is preferably less than 50,000 mm$^2$.

The usable table space provided by the table when in its first deployed position may be non-symmetrical. Deviating from the typical design practice of requiring symmetry in a table configuration, allows greater flexibility in the possible technical realisations of the seat arrangement. For example, the direction of movement of the table need not be in a straight line, or perpendicular to the aft face of the structure in the region from which it is deployed, or into which it is inserted.

The table may be arranged for movement to a second deployed position, in which at least part of said first portion of the table is positioned outside of the structure. The table may, in the second deployed position, provide a usable table space, having a second area. The second area is preferably larger than the first area. The area of the second area may be greater than 80,000 mm$^2$.

The table and console may be so arranged that progressively more usable table area is exposed as the table is moved from the first deployed position to the second deployed position. The width of the table when in its second deployed position may be the same as the width of the table when in its first deployed position.

The table may be arranged to be configured in a third deployed position, in which the table provides a usable table space, having a third area. The third area is preferably larger than the first area, and is preferably larger than the second area.

Above, it is stated that there may be an aperture or recess to facilitate insertion of the table into said structure. The aperture or recess may have a width that is between 100% and 110% of the width of the table when in its first deployed position. The aperture or recess may have a width that is between 100% and 110% of the width of the table when in its second deployed position. The aperture or recess may have a width that is less than the width of the table when in its third deployed position.

The table may include at least one table leaf. The leaf or leaves may be arranged to be deployed to increase the area of table space usable by a passenger seated in the first seat. Movement of one or leaves may be the means by which the configuration of the table is changed as between the second and third deployed positions.

The or each table leaf may be arranged to slide from a main body of the table. The or each leaf may fold out from the main body. There are preferably two table leaves arranged to extend the table space on opposite sides of the table. The or each table leaf may be arranged on top of the main body when the table is in the first or second deployed positions.

A first side of a table leaf may be arranged to be used when the table is in the second deployed position. A second opposite side of the table leaf may be arranged to be used when the table is in its third deployed position. A part of the first side of the table leaf may be used when the table is in the first deployed position.

The seat arrangement may be so configured that it is not possible to move the table from the first to third deployed position, without first passing via the second deployed position.

The table may be arranged to extend out from the structure and at least partly be supported, and preferably fully supported, by a support arm, which forms part of the deployment mechanism of the table. The support arm may be arranged such that it is at least partially retained in the structure at all times. The support arm may have a width that is narrower than the table when in its third deployed position. The arm may have a width that is narrower than the table when in its first deployed position. The support arm may be defined by means of a unitary structure. Alternatively, the support arm may be defined by a multi-part structure, for example comprising two laterally spaced-apart parallel side-arms.

The table is preferably arranged to have a plurality of set positions. The table is preferably arranged to have a plurality of set deployed positions, preferably between two and ten set deployed positions. The stowed position may be a set position. The table may for example have only a finite number of set positions, whereas there may be an infinite number of positions that the table could adopt between the set positions. When the table is located at a set position, the resistance to movement of the table to another set position may be greater than the resistance to movement of the table to a set position when the table is located between successive set positions.

Features of the present invention as described herein may also have application in a case where the table is stowed differently than as set out above in relation to the first aspect of the invention. Thus, in accordance with a second aspect of the invention there is provided an aircraft seat arrangement comprising a first seat, and a table, wherein the table is arranged for movement to a stowed position, in which the table is accommodated within a structure, the table is arranged for movement to a first set deployed position, in which a first portion of the table is accommodated within the structure, and a second portion of the table is positioned outside of the structure, such that the table provides a usable table space, having a first area, for use by a passenger seated in the first seat, and the table is arranged for movement to a second set deployed position, in which at least part of said first portion of the table is positioned outside of the structure, such that the table provides a usable table space, having a second area, for use by a passenger seated in the first seat, the second area being larger than the first area.

It will be appreciated that the table when in its stowed position, may be wholly accommodated within the structure. It is however within the scope of the invention for a small portion (say, less than 10% in area of the useable table space of the table) to protrude from the structure when the table is in its stowed position. Allowing a small portion of the table to protrude when stowed may provide an easy way for a passenger to grab the table to pull it open. The table may be arranged such that in order to release the table from a latched and stowed position the table must be pushed. There may be a, preferably sprung, push-release mechanism provided for this purpose.

The present invention also provides a table that is arranged and configured so as to be suitable for use as the table of the aircraft seat arrangement of any aspect of the invention described or claimed herein.

The present invention also provides a method of using a table in an aircraft. The method may include a step of a passenger seated in a first seat pulling a table horizontally out from within a structure located forward of the first seat to a position in which the passenger can use the table. The method may include a step of a passenger pushing the table horizontally into the structure, for example thus inserting the table into the structure. The method may include a step of a passenger seated in a first seat using a table in a first set configuration, in which the table presents a first area of useable table-space. The passenger may use the table in a second set configuration, in which the table presents a second area of useable table-space. The passenger may use the table in a third set configuration, in which the table presents a third area of useable table-space. The passenger may stow the table so that there is substantially no useable table-space presented. The third area may be larger than the second area. The second area may be larger than the first area. The use of the passenger by the table (i.e. using the table as a table) may include placing an object on the table. The use of the table by the passenger may include removing an object supported by the table from the table. A passenger may sit on a seat when using the table. The passenger may use the seat in a bed-mode.

It will of course be appreciated that features described in relation to one aspect of the present invention may be incorporated into other aspects of the present invention. For example, the method of the invention may incorporate any of the features described with reference to the apparatus of the invention and vice versa. The second aspect of the invention may also include any of the features described in relation to the first aspect.

DESCRIPTION OF THE DRAWINGS

Embodiments of the present invention will now be described by way of example only with reference to the accompanying schematic drawings of which:

FIG. 4 shows a section of the seating arrangement of the first embodiment taken about the plane B-B shown in FIG. 3;

FIG. 13c is a sectional view taken about the plane B-B shown in FIG. 3 of a portion of the seating arrangement of the first embodiment showing the table in the third deployed position;

DETAILED DESCRIPTION

Figure 1:
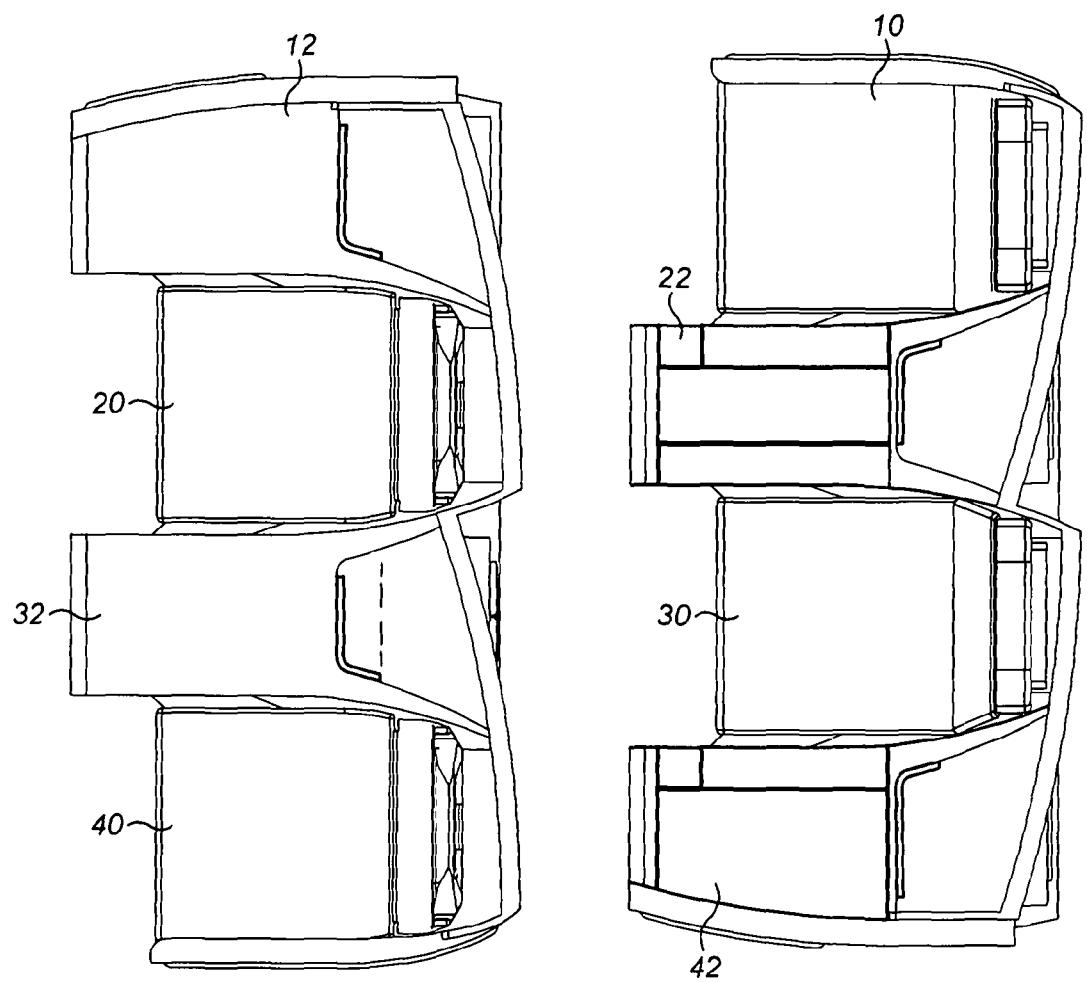
FIG. 1 shows a plan view of a seating arrangement according to a first embodiment of the invention.
Figure 2:
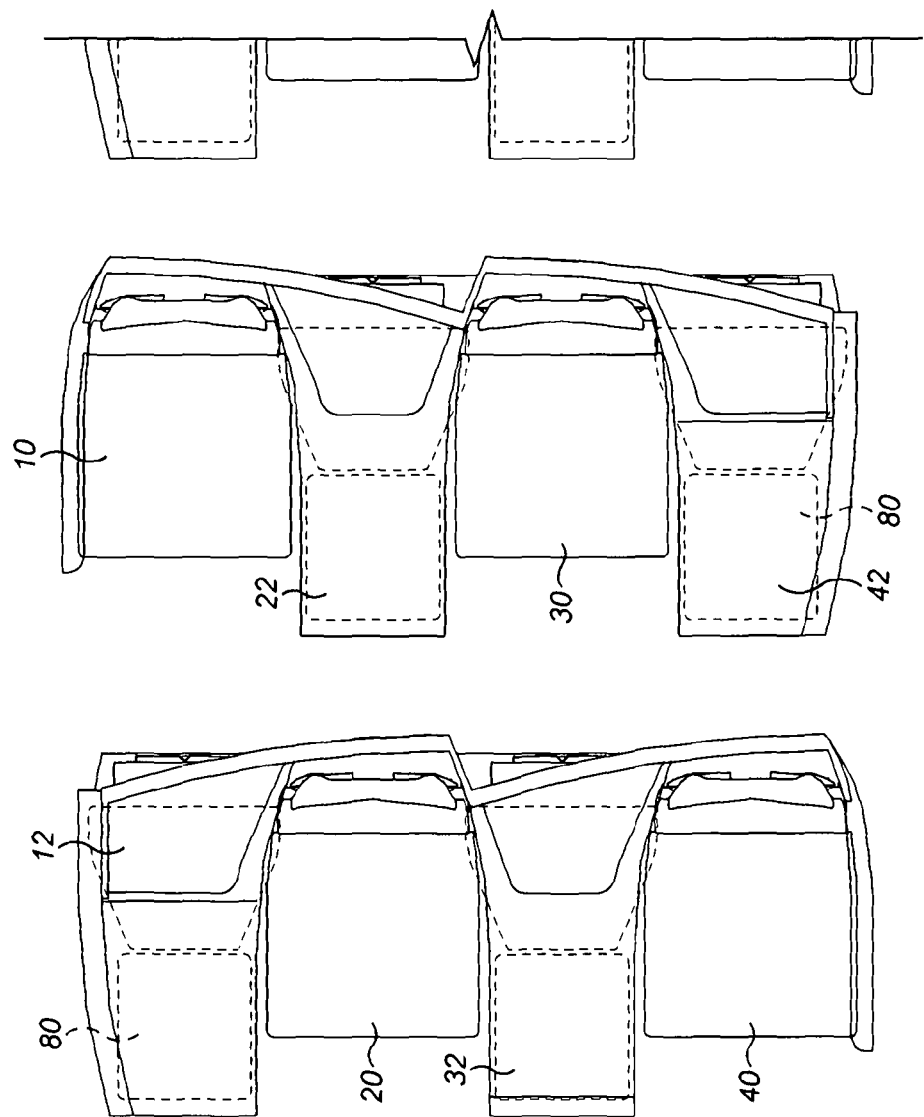
FIG. 2 shows a further plan view of the seating arrangement of the first embodiment.

FIGS. 1 to 13c and 18 show an aircraft seat arrangement for a premium class (premium economy or business class for example) comprising a table moveable between a stowed position and a plurality of deployed positions. FIGS. 1 and 2 show, in plan views, four seats and four consoles. There is therefore a first seat 10 aft of a first console 12, a second seat 20 fore of a second console 22, a third seat 30 aft of a third console 32 and a fourth seat 40 fore of a fourth console 42. There is therefore a first row formed by (in order from one end of the row to the other) the first seat 10, the second console 22, the third seat 30, and the fourth console 42, and a second row formed by (in order from one end of the row to the other) the first console 12, the second seat 20, the third console 32, and the fourth seat 40. The second row is in front of the first row. Thus, the first seat 10 is located directly aft of the first console 12 and is directly adjacent to the second console 22.

Figure 3:
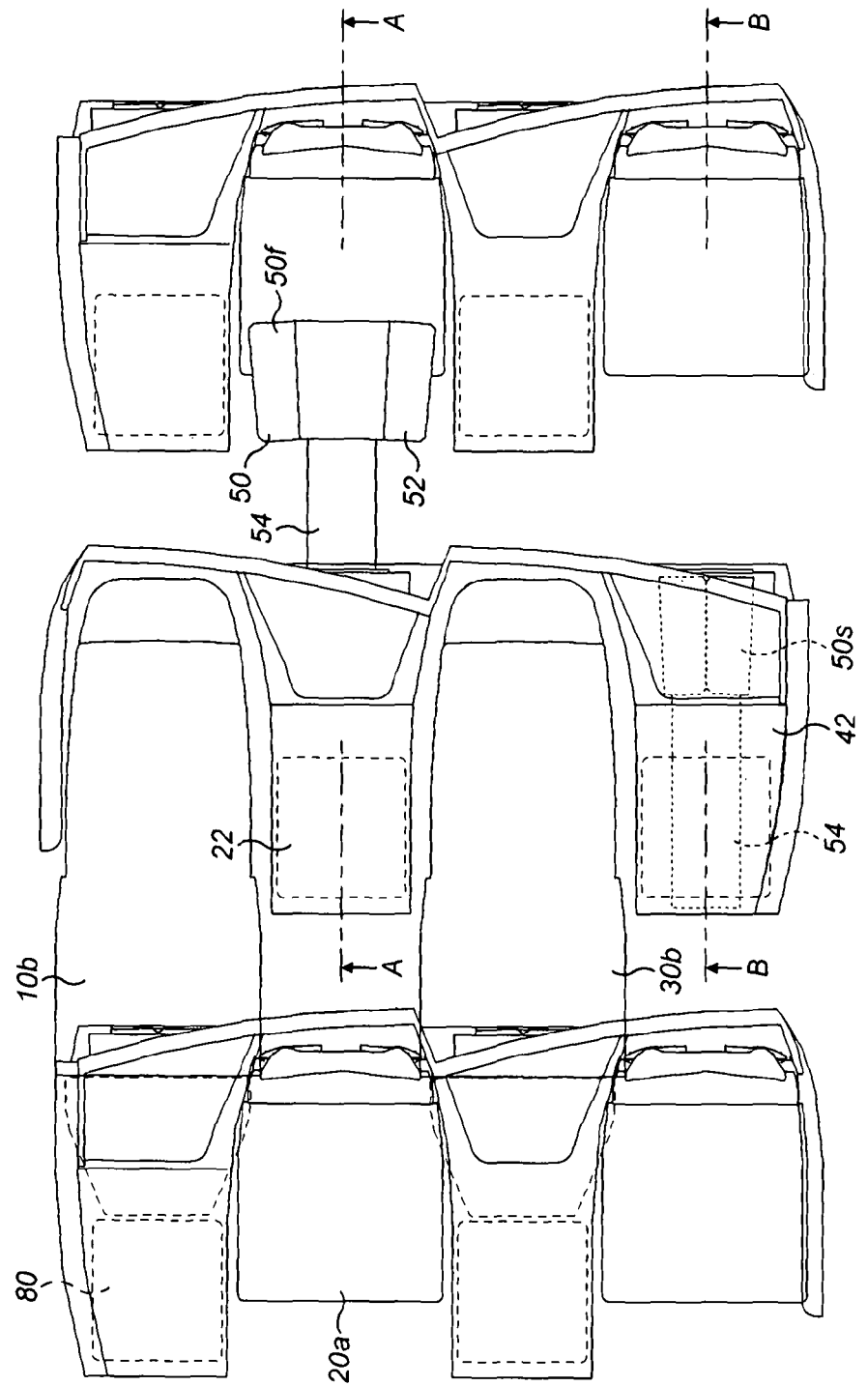
FIG. 3 shows in plan view the seating arrangement of the first embodiment with a seat in "bed-mode"

The seats are also each convertible into a bed-mode. FIG. 3 shows such a bed-mode for the first seat 10b and the third seat whilst showing the second seat 20a and the fourth seat in seat mode.

With reference to FIG. 3 and the sectional view shown in FIG. 4 (the view of the section defined by the plane represented line B-B in FIG. 3), each console includes a table 50 for use by the passenger in the seat positioned aft of the console. The table 50f of the second console 22 is shown in FIG. 3 in its fully deployed position. The table 50s of the fourth console 42 is shown in FIG. 3 in its stowed position. The first console 12 similarly houses a table 50 which is moveable between a stowed position, in which the table 50 is inserted within the first console 12, and a deployed position, in which the table 50 is positioned for use by the passenger of the first seat. Further explanation concerning the deployment of the table is provided below.

Figure 5:
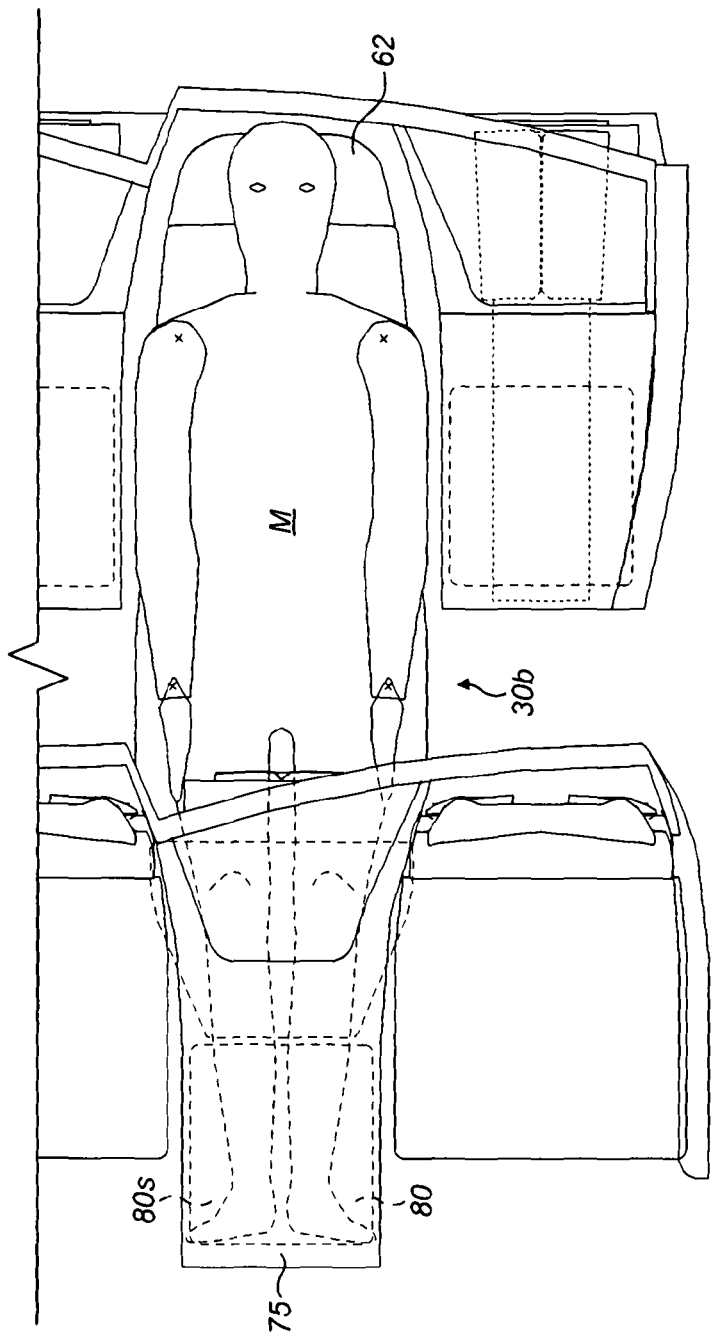
FIG. 5 shows in plan view a portion of the seating arrangement of the first embodiment with a passenger using a seat in "bed-mode"

FIG. 4 shows the fourth console 42 with the table 50s in the stowed position. The seats, as illustrated in FIG. 4, have cushions including a head cushion 62, a back cushion 64, a seat pan cushion 68, and a leg cushion 66. Each console includes a foot-well 80 (shown in FIGS. 2, 3, 4 and 5 for example) for use by the passenger in the seat positioned aft of the console. FIG. 5 shows a 95% man lying on the third seat 30b when in bed-mode. It will be seen that the feet of the passenger extend into the foot-well and that the upper surface 80s (also shown in FIG. 4) of the foot-well 80 acts as an extension to the bed surface defined by the seat cushions 62, 64, 66, 68. An advantage of the present embodiments in comparison to other similar designs in the prior art is that the foot-wells of all consoles are very similar in shape and size. Thus, the foot-well of the first console has a shape that is substantially identical to the shape of the foot-well of the third console.

Figure 6:
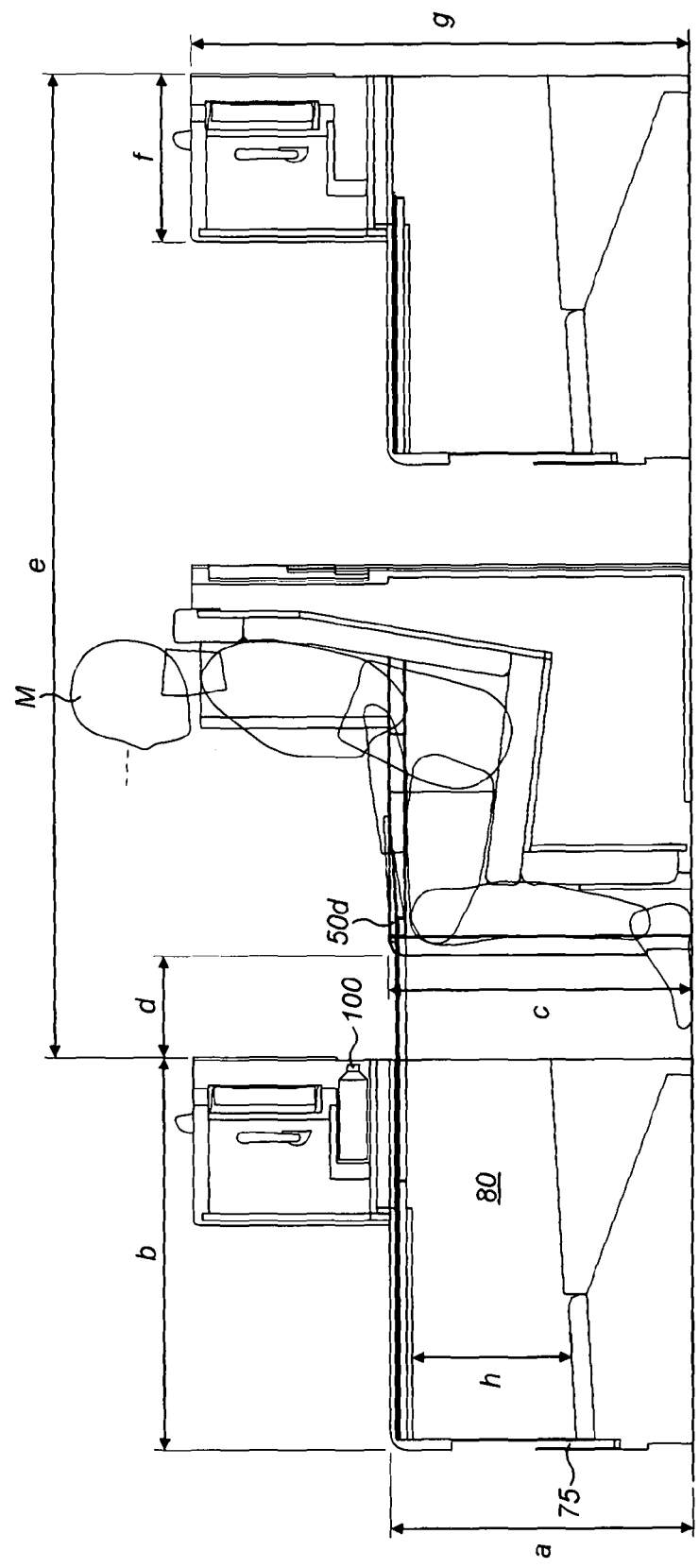
FIG. 6 shows a sectional view the seating arrangement of the first embodiment with a passenger using a seat in "seat-mode"

The seating arrangement, being a class of seat superior to an economy class seat layout, is more spacious. FIG. 6 shows various dimensions, of which a=26 inches, b=35 inches, c=27 inches, d=10 inches, e=90 inches (equating to a pitch of 45 inches), f=15 inches, g=44 inches, h=14 inches (all measurements being approximate to within the nearest inch or two). The seat pan cushion is about 20 inches wide and there is a separation between adjacent seats in a row of about 14 inches. The centre lines of the seats are therefore about 34 inches apart.

Figure 7A:
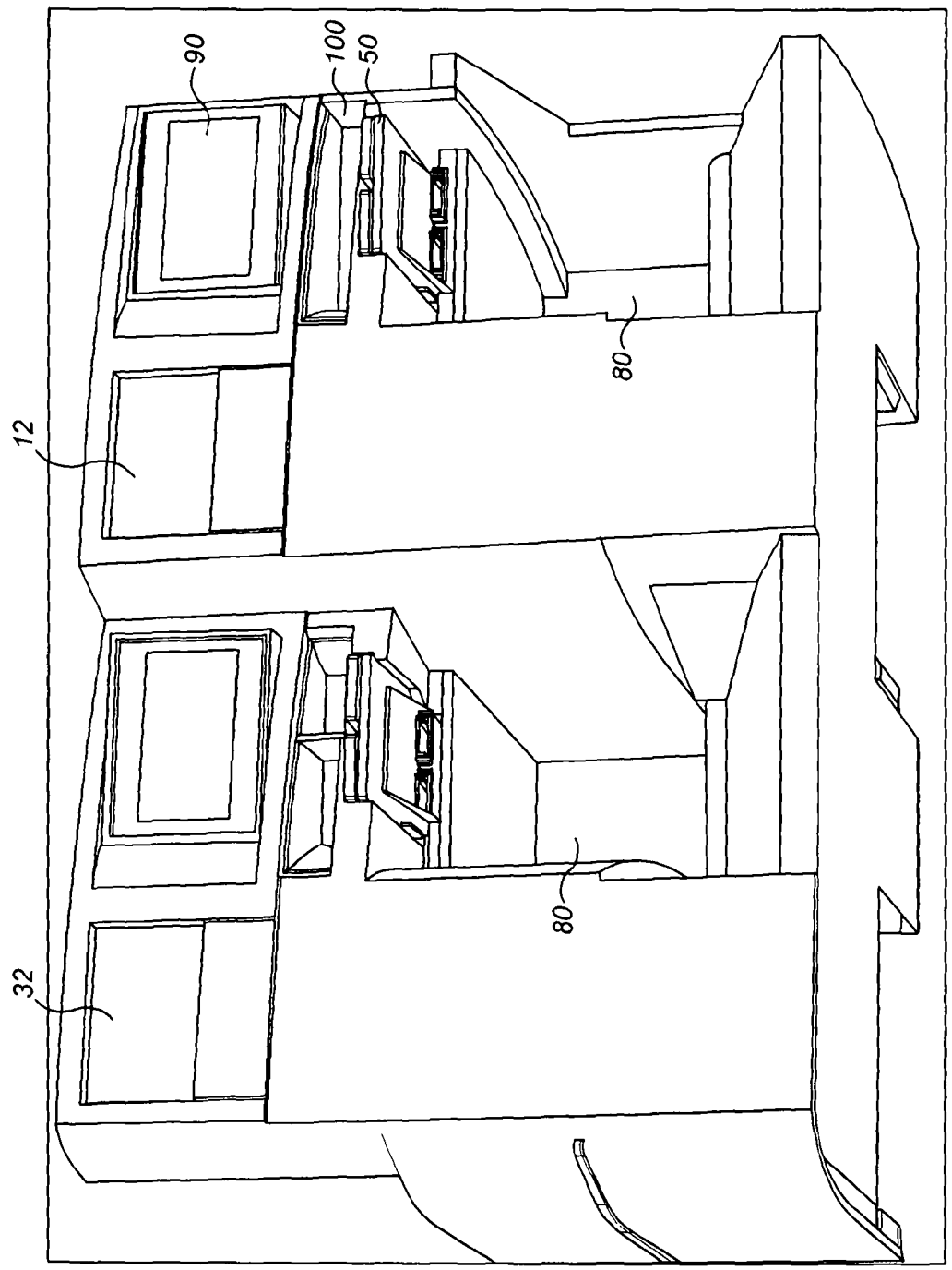
FIGS. 7a and 7b are perspective views of a portion of the seating arrangement of the first embodiment showing two tables in the stowed position.
Figure 7B:
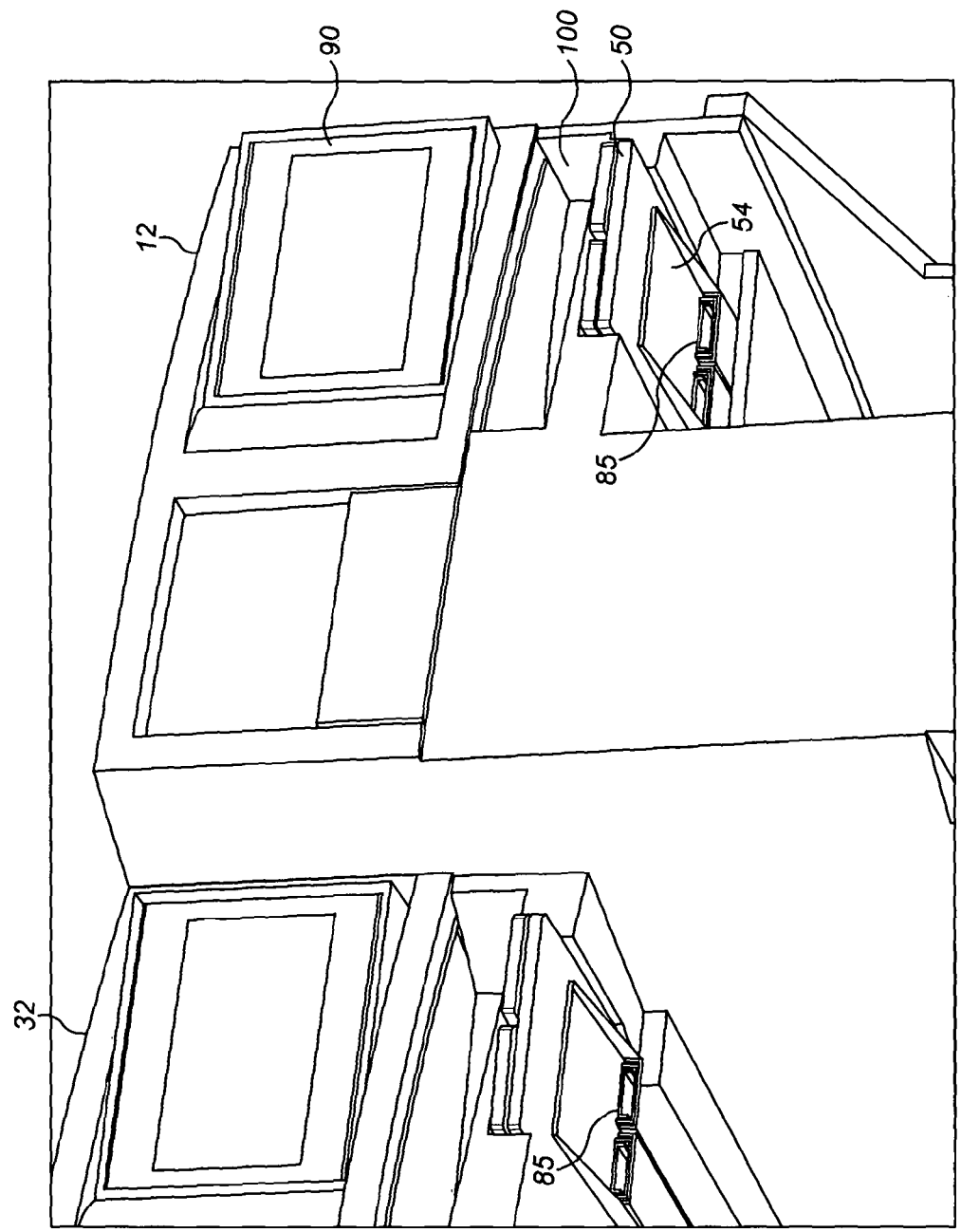

FIG. 7 shows the foot-wells 80 beneath the tables 50 of the first and third consoles 12, 32. Each console also includes an IFE monitor 90 and a horizontal stowage space 100 located beneath the monitor. The table 50 is, when stowed, located directly beneath the stowage space 100 and is oriented in an approximately horizontal position. The console defines a passageway, open on its lower side, but bounded by an upper surface and two side surfaces, in which the table is stowed. As can be seen in FIGS. 7a and 7b, the underside of the table 50, when stowed, is exposed to a free-space defined by the foot-well 80. The console includes slide runners 85 that are mounted in fixed position relative to the console foot-well 80 and that slidingly support a support arm 54 fixed to the table, thus enabling translational sliding movement of the table 50 into and out of the console. Movement of the table 50 from its stowed position to a number of different deployed positions will now be described with reference to FIGS. 8a to 13c.

Figure 8A:
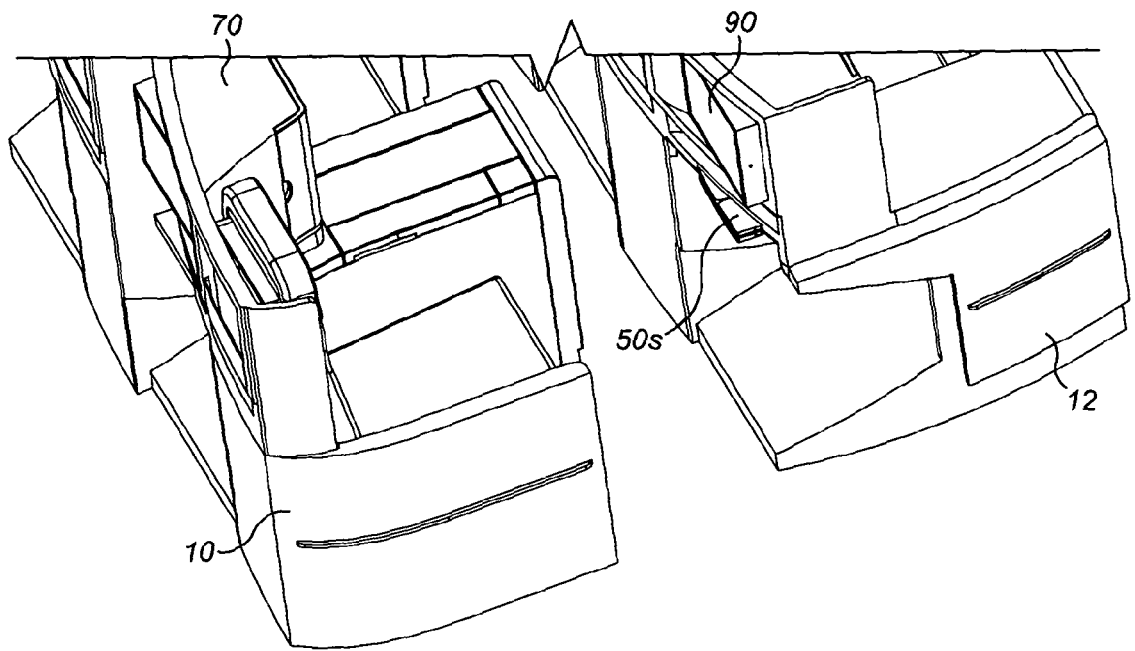
FIG. 8a is a perspective view of a portion of the seating arrangement of the first embodiment with a table in the stowed position.
Figure 8B:
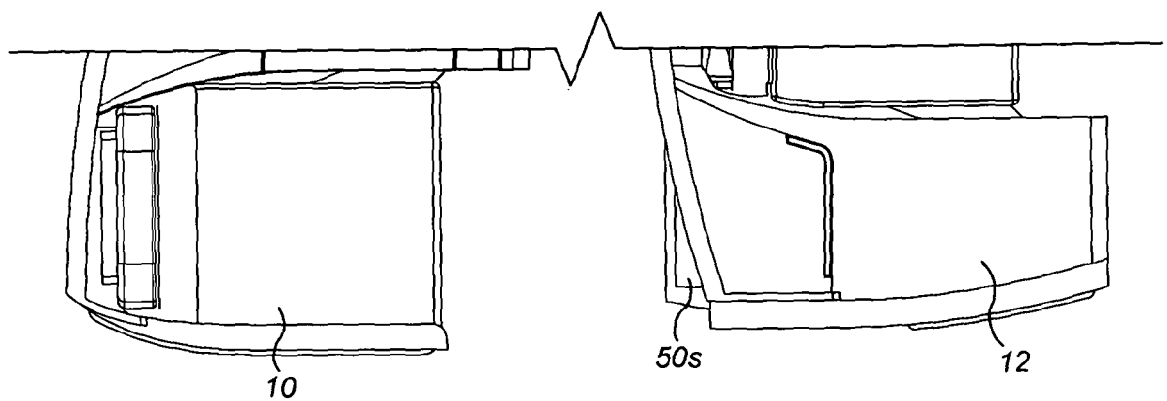
FIG. 8b is a plan view of a portion of the seating arrangement of the first embodiment with a table in the stowed position.

FIGS. 8a and 8b show the first seat 10 and first console 12 with the table 50s stowed in the console 12. The table has an aft edge that is horizontal and perpendicular to the fore-aft direction. The console however has an aft surface that curves at a sloped, acute angle, to the perpendicular. As a result of the geometry, and the relative position of the table and the aft surface of the console, it will be seen that a very small portion (including a corner) of the table protrudes from the console (part only of the front edge of the table being exposed), whilst most of the table is housed within the console.

Figure 9:
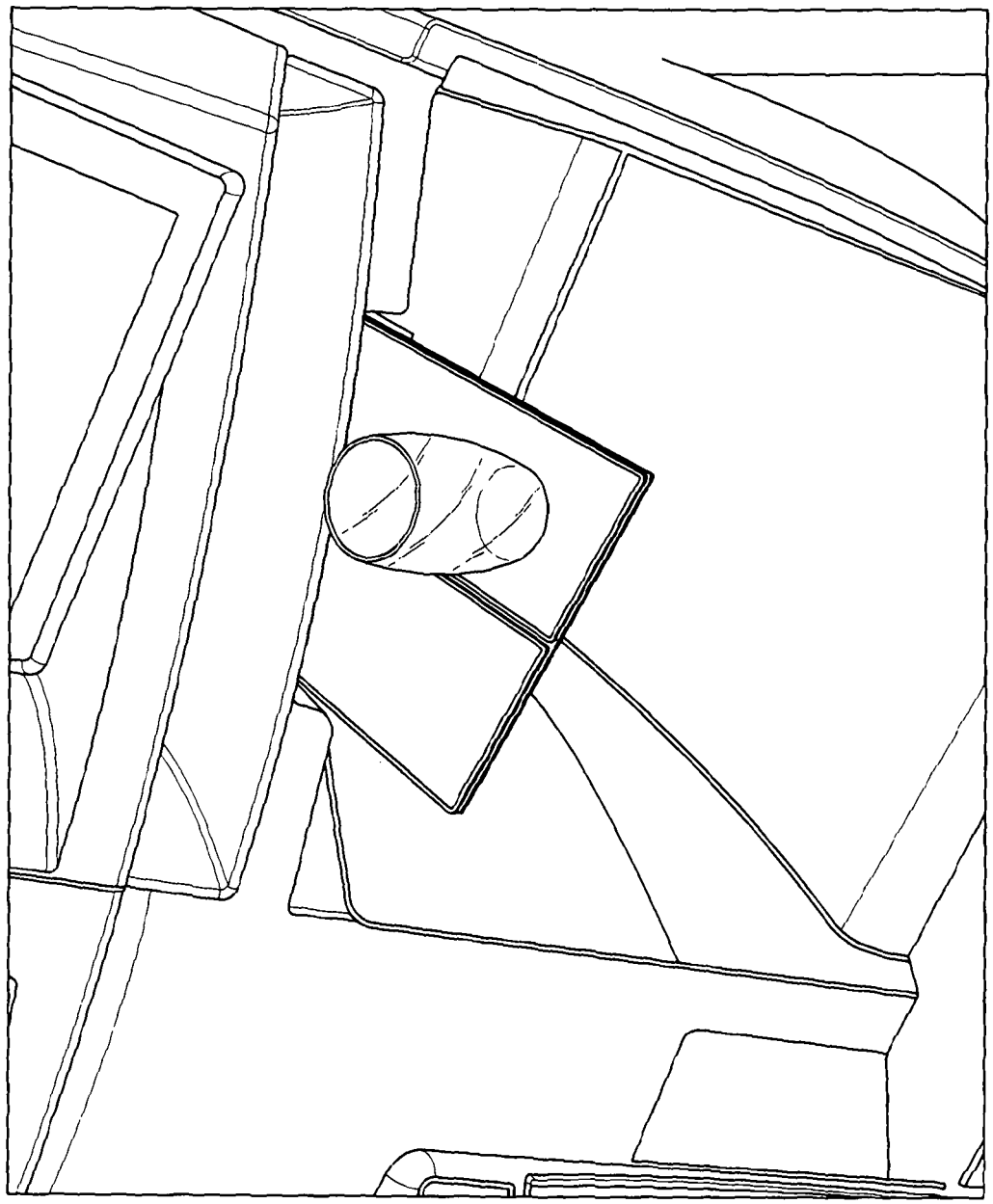
FIG. 9 is a perspective view of a portion of the seating arrangement of the first embodiment showing the table in a first deployed position.
Figure 10:
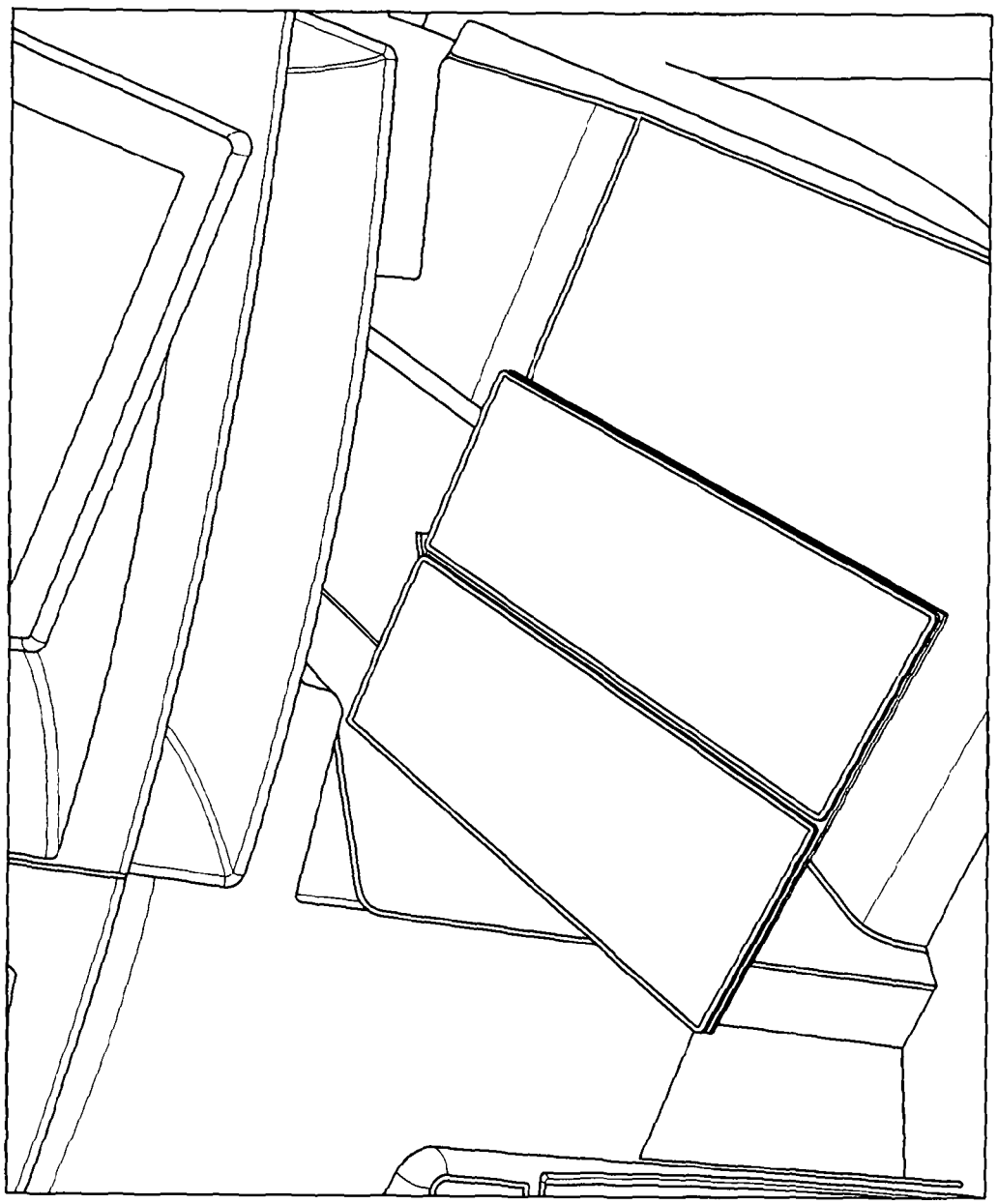
FIG. 10 is a perspective view of a portion of the seating arrangement of the first embodiment showing the table moving from the first deployed position to a second deployed position.

A passenger (not shown in FIGS. 8a and 8b) seated in the first seat 10 can by grabbing the protruding portion of the table move it horizontally out from within the console to a first deployed position where the table acts as a cocktail table, as shown in FIG. 9. Either the runners 85 or the arm 54 of the table 50 have a detent and the other of the runners 85 and the arm 54 have a corresponding formation such that the table resists movement from the first deployed position more than the resistance to movement encountered at a position between the stowed and first deployed position.

Figure 11A:
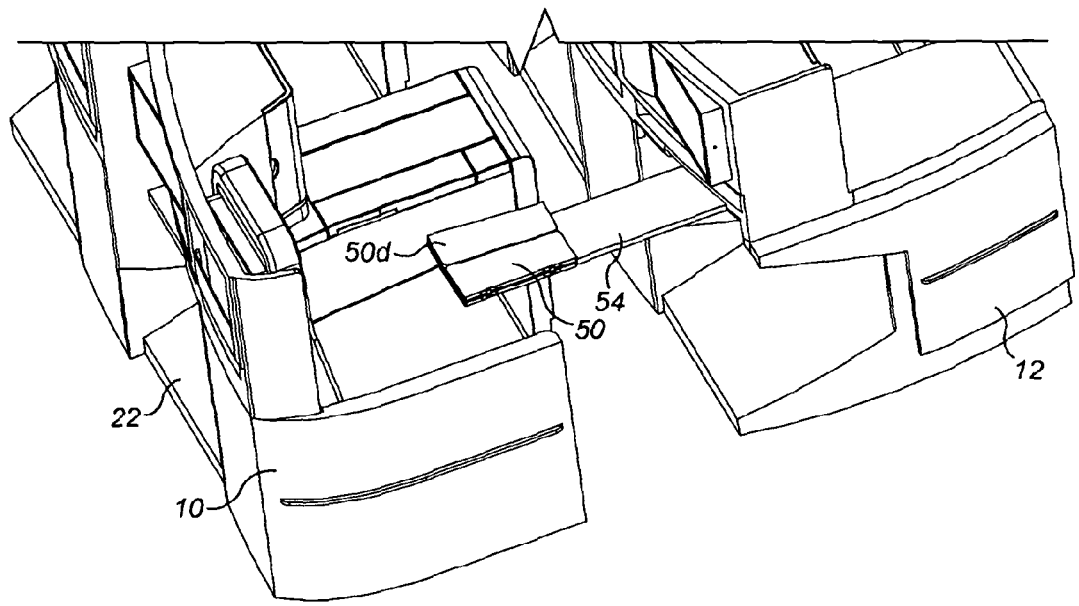
FIG. 11a is a perspective view of a portion of the seating arrangement of the first embodiment with the table in the second deployed position.
Figure 11B:
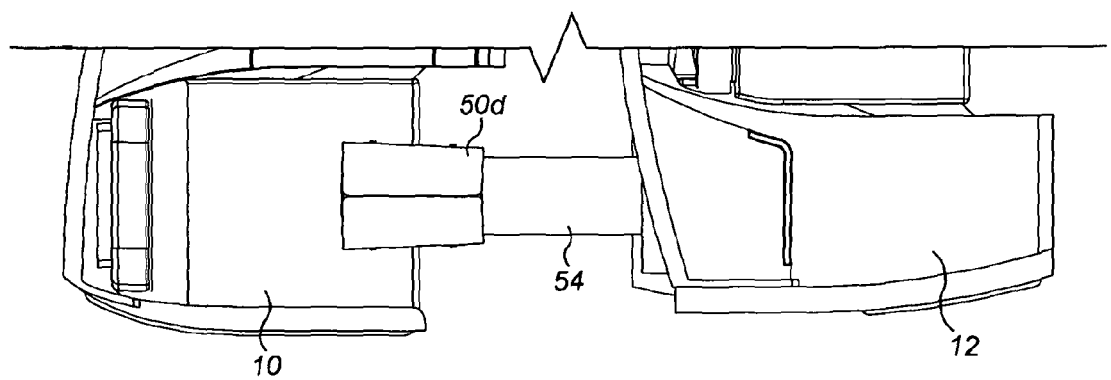
FIG. 11b is a plan view of a portion of the seating arrangement of the first embodiment with the table in the second deployed position.
Figure 12:
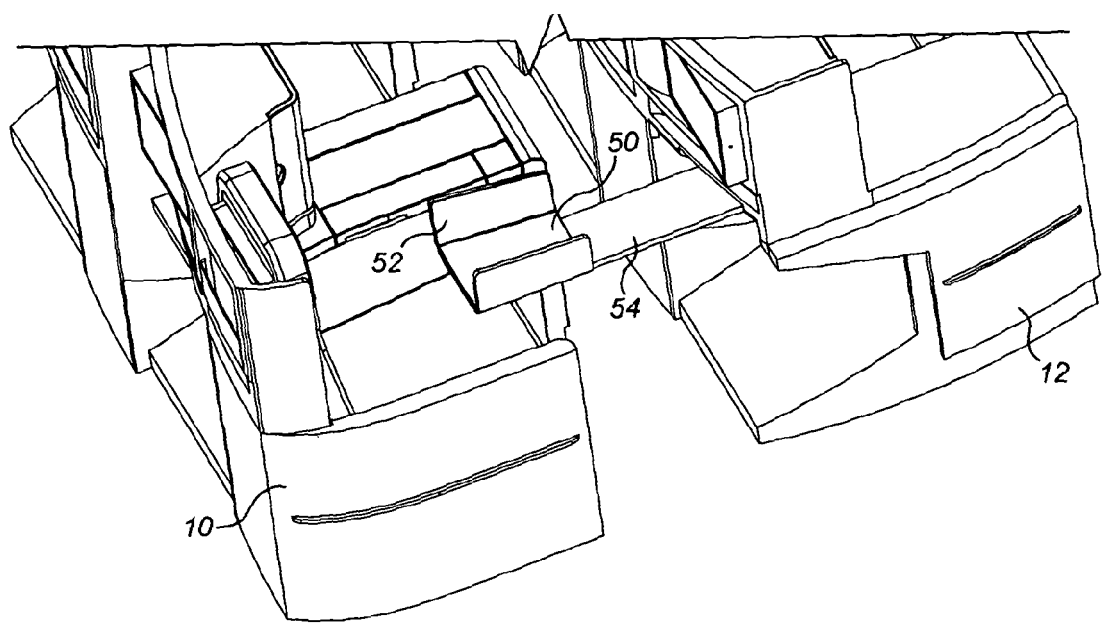
FIG. 12 is a perspective view of a portion of the seating arrangement of the first embodiment showing the table moving from the second deployed position to a third deployed position.

The passenger can pull the table 50 out to a second deployed position, shown in FIGS. 11a and 11b, in which the table 50d is fully extended from the console and is configured in a second deployed position. In this position the arm 54 of the table moves out of the console 12. The table moves via the position shown in FIG. 10. Again, there is a detent arrangement that such that the resistance of the table to movement from the second deployed position is more than the resistance to movement encountered at positions between the first and second deployed positions. The area of the table useable by the passenger is significantly greater (more than 150% of the size when in the cocktail table mode) when in the second deployed position as compared to the first deployed position.

Figure 13A:
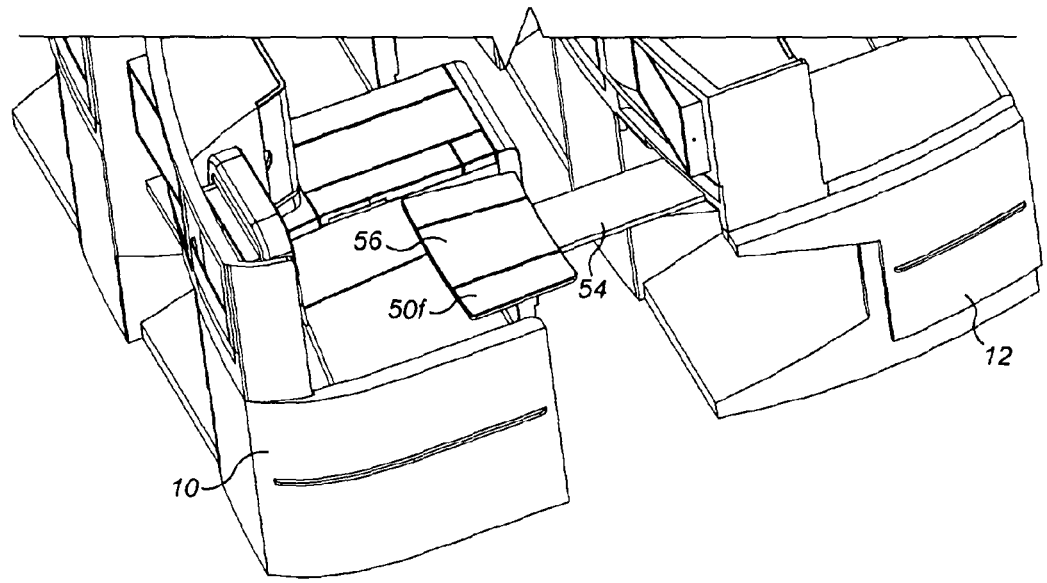
FIG. 13a is a perspective view of a portion of the seating arrangement of the first embodiment with the table in the third deployed position.
Figure 13B:
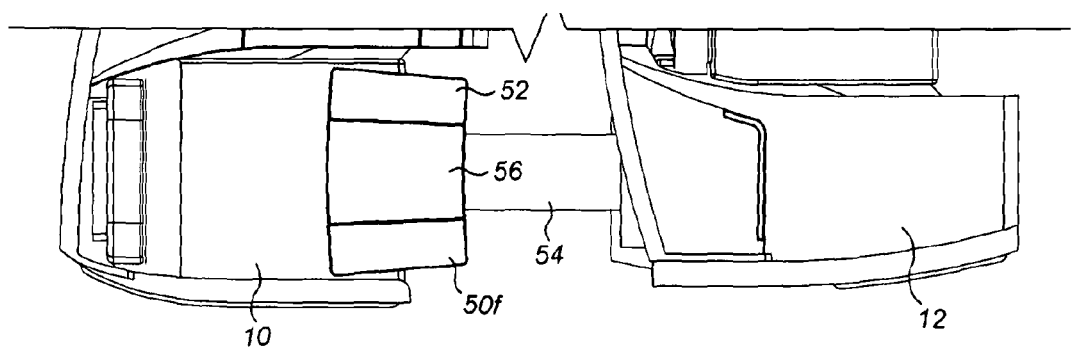
FIG. 13b is a plan view of a portion of the seating arrangement of the first embodiment with the table in the third deployed position.

The passenger can then fold out leaves 52 of the table 50 to configure the table in a third deployed position, shown in FIGS. 13a, 13b and 13c (FIG. 13c being a cross-section taken about the line A-A in FIG. 3), in which the table 50f is extended from the console by the same amount as in the second configuration. The table has two leaves 52, hinged on the opposite lateral edges of the table 50. In the second deployed position a first surface of each leaf 52 forms the upper surface of the table, and the leaves meet in the middle (the centre-line of the table 50). In the third deployed position, when the leaves are folded out, a second surface of each leaf 52 (opposite the first surface mentioned above) forms the upper surface of the table, together with a central portion 56 of the table, the upper surface of which having been covered by the leaves 52 in the second deployed position. The leaves 52 of the table 50 move via the position shown in FIG. 12. Each leaf 52 is supported in the horizontal position by means of the surface of the edge of the leaf adjacent to the hinge abutting the corresponding (opposing) surface of the central portion of the table adjacent to the hinge. The area of the table useable by the passenger is significantly greater (about twice the size when in the second deployed position) when in the third deployed position as compared to the second deployed position.

The passenger may of course insert the table 50 back into the console by means of pushing it in a substantially horizontal direction. It will be seen that the recess into which the table 50 is inserted is a close fit around the table 50 once the leaves 52 have been folded back to their closed position.

A passenger in a seat has access to various storage areas in addition to the storage 100 beneath the monitor. There is for example a vertically-arranged document storage space 75 positioned at the fore end of the console (see for example FIG. 5 or 6). There is also cupboard 70 (see for example FIGS. 4, 6, and 8a).

Figure 14:
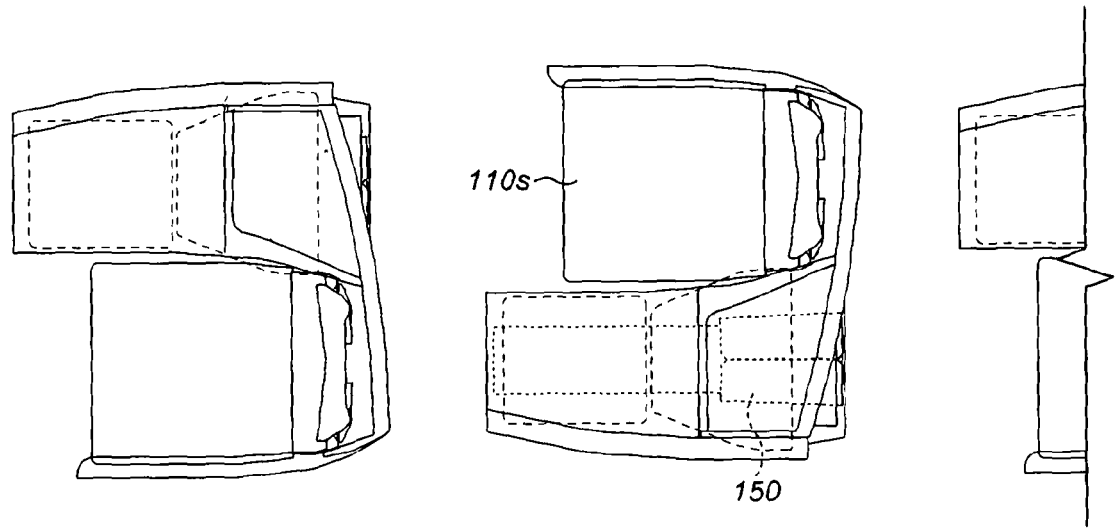
FIG. 14 shows in plan view a seating arrangement of a second embodiment showing a seat in "seat-mode"
Figure 15:
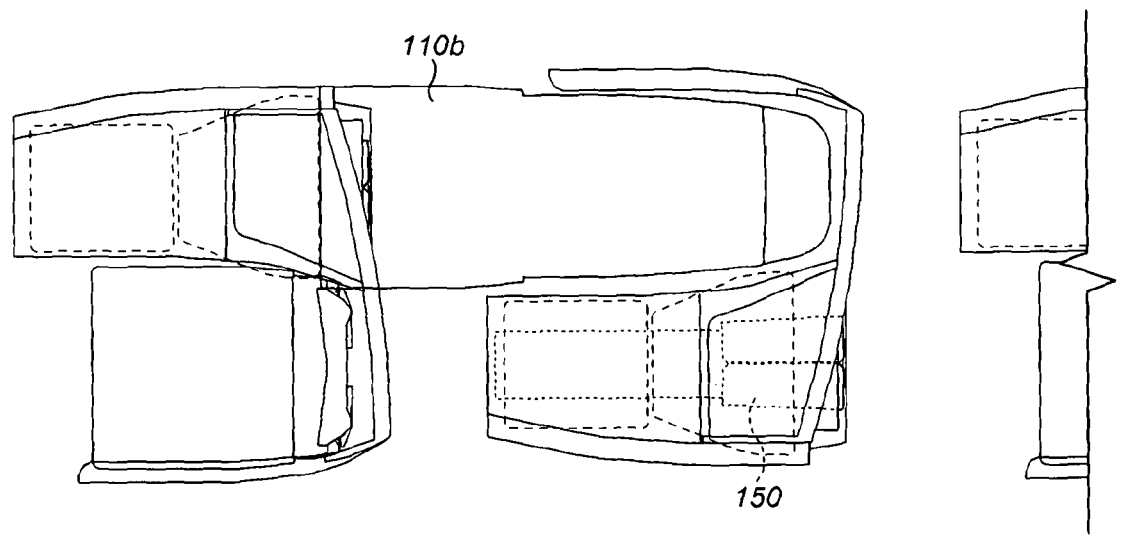
FIG. 15 shows in plan view the seating arrangement of the second embodiment showing a seat in "bed-mode"

The above first embodiment can of course be provided in layouts having fewer items per row. For example, FIGS. 14 and 15 show an aircraft seat layout of a second embodiment, in which each row comprises only one seat and one console. Such a layout may be of use at the outboard portions of the cabin. FIG. 14 shows a seat 110s in a seat mode, whilst FIG. 15 shows the same seat 110b in a bed-mode. The deployable table 150 is shown in its stowed position inserted into the body of the console.

Figure 16:
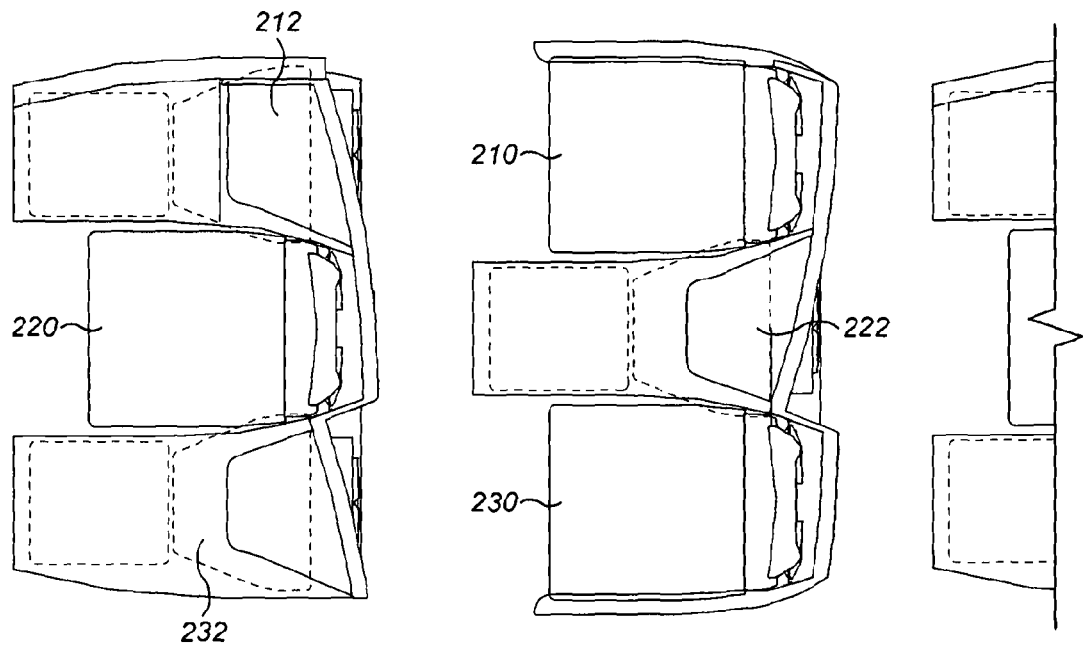
FIG. 16 shows in plan view a seating arrangement of a third embodiment showing two seats in "seat-mode"
Figure 17:
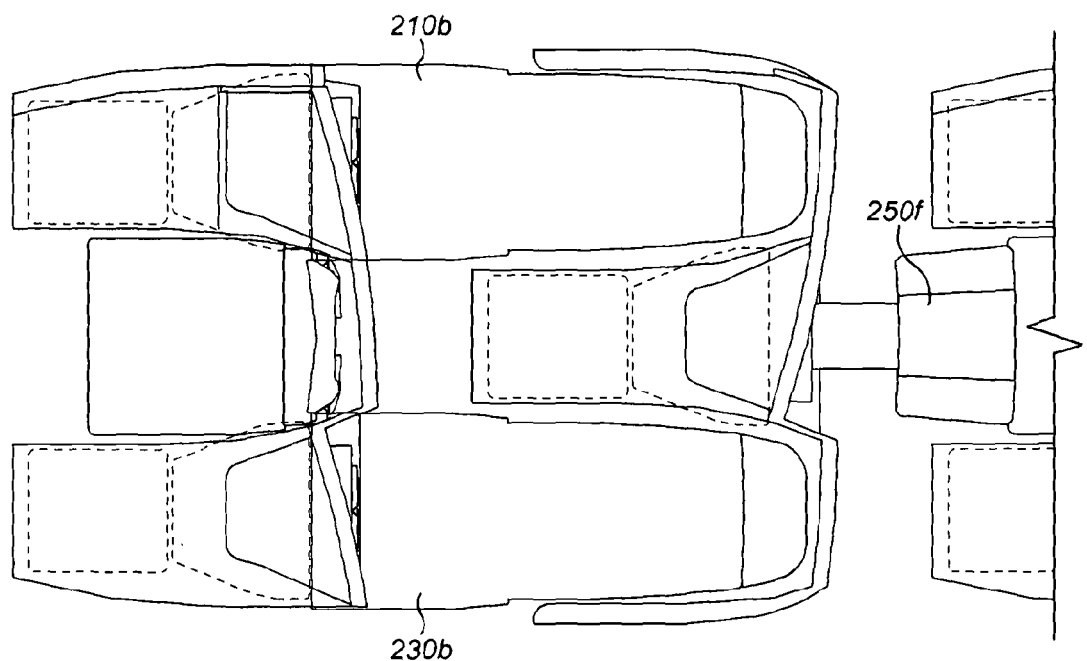
FIG. 17 shows in plan view the seating arrangement of the third embodiment showing the two seat in "bed-mode"

FIGS. 16 and 17 show an aircraft seat layout of a third embodiment, in which there are three items in each row. There are shown first, second and third seats 210, 220, 230 and first, second and third consoles 212, 222, 232. The rows thus comprise alternatively (a) two seats (e.g. first and third seats 210, 230) and one console (second console 222) and (b) one seat (e.g. second seat 220) and two consoles (e.g. first and third consoles 212 and 232). Thus, FIG. 16 shows a first row having the first seat 210 and the third seat 230, separated by the second console 222 and a second row in which the first and third consoles 212 and 232 are separated by the second seat 220. FIG. 17 shows the first and third seats 210b, 230b in bed-mode and the table 250f of the second console in its fully deployed position for use by the passenger seated in the seat behind.

Figure 18:
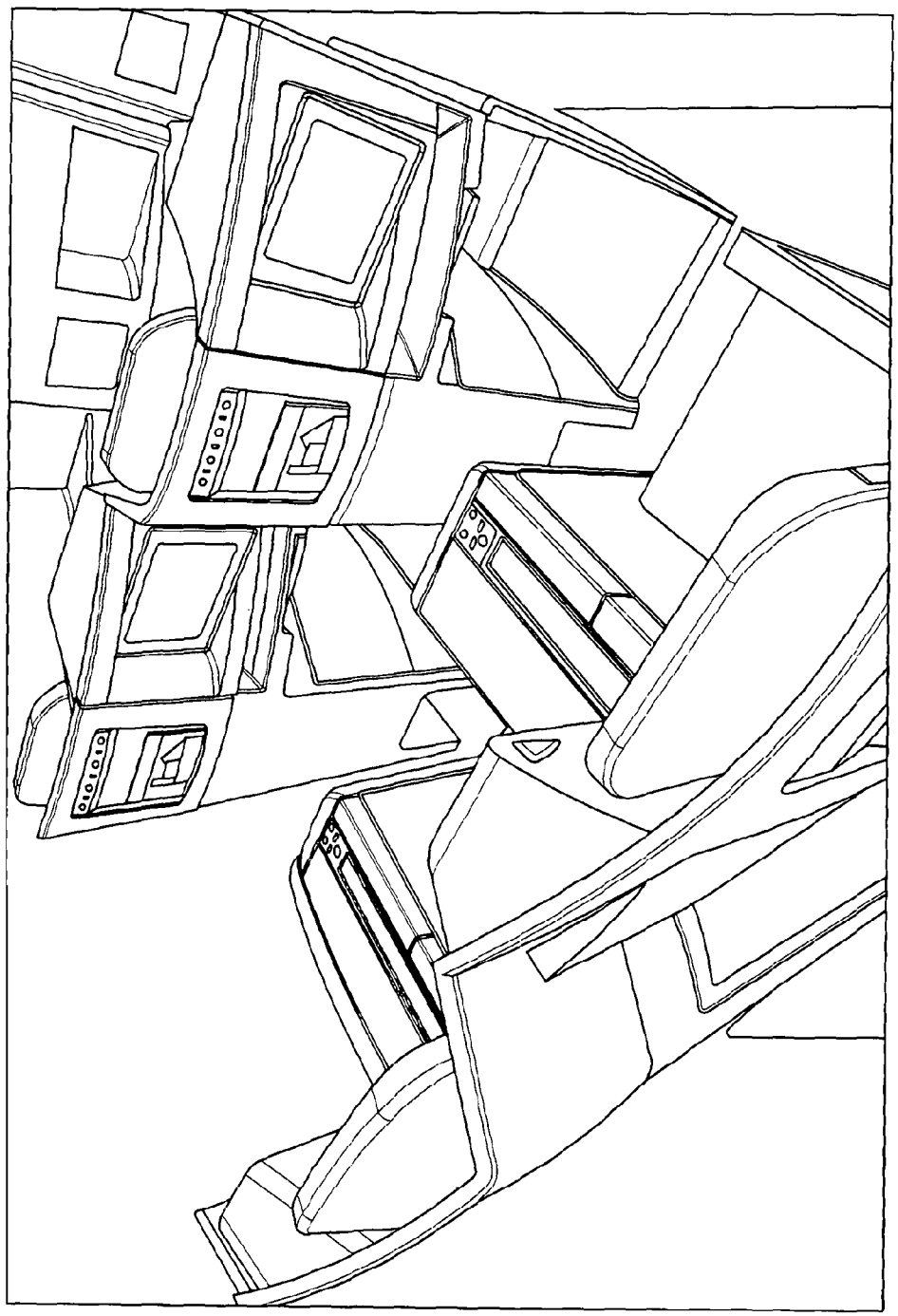
FIG. 18 is a perspective view of a portion of the seating arrangement of the first embodiment where armrests are provided at different heights.
Figure 19:
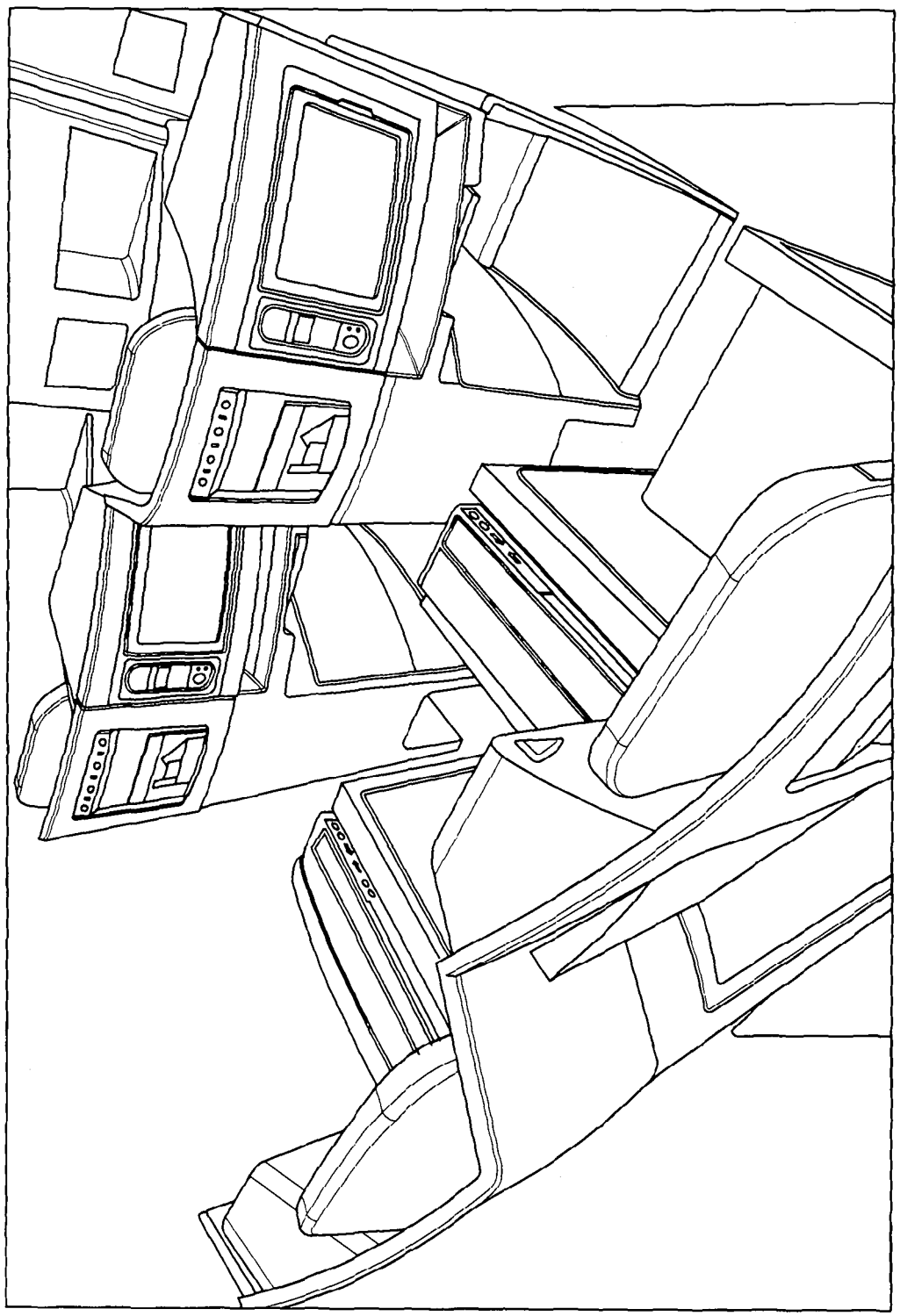
FIG. 19 is a perspective view of a portion of the seating arrangement of a fourth embodiment where the armrests are provided at the same height.

A fourth embodiment is shown in FIG. 19, which shows a perspective view of the first to fourth seats and first to fourth consoles of an aircraft seat assembly. To aid understanding of the salient features of the fourth embodiment, an illustration of the same view of the aircraft seat assembly of the first embodiment is shown in FIG. 18. FIG. 18 shows that for a seat by the aisle, the arm-rests are at different heights. Thus, the adjacent console includes a first arm rest portion and the seat itself includes a second arm rest portion. The height if the first arm rest portion can not be higher than a certain limit because of the space required for the aisle. However, if the console is to have a flat upper surface, it must be a certain height to accommodate the table that is stowed within it for the seat behind. A solution to these potentially conflicting requirements is to have the arm-rests at different heights, as shown in FIG. 18. An alternative solution, which is provided by the fourth embodiment as shown in FIG. 19, is to have the armrest portions of the seat at substantially the same height by means of allowing the upper surface of the console to include a step between the arm rest portion and the rest of the upper surface of the console.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Instead of the table inserting into a passageway defined by a recess where the underside of the table is exposed to the foot-well, the passageway could be defined by a closed passageway with a lower surface providing a bather between the underside of the table and the foot-well. When the passageway is in the form of an aperture, the table mat be inserted into the console via a slot-shaped aperture in the console.

When the seats are the foremost seats in a region of the cabin, it may be beneficial to arrange the table in much the same way as described above, but in the monument in front of the seats rather than in a console.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft seat arrangement comprising
a first seat in a first row,
a second seat in a second row, the second row being located forward of the first row,
a first console located in the second row and being in front of the first seat, the first console being located adjacent to the second seat, and
a second console located in the first row and being adjacent to the first seat, said second console being directly aft of said second seat,
whereby the first and second consoles and the first and second seats are in a staggered arrangement, and
the aircraft seat arrangement further comprises
a table housed by said first console, wherein
the table is arranged for movement to a stowed position, in which the table is inserted within said first console,
the table is arranged for movement to a deployed position, in which the table is positioned aft of the first console so as to be suitable for use by a passenger when seated in the first seat, and
in the deployed position, the table is disposed above legs of a passenger when the passenger is seated in the first seat.

2. An aircraft seat arrangement according to claim 1, wherein the table is arranged such that the movement of the table from the stowed position to the deployed position is limited to movement in a substantially horizontal direction.

3. An aircraft seat arrangement according to claim 1, wherein the first console comprises an aperture or recess through which the table moves when being inserted within said first console.

4. An aircraft seat arrangement according to claim 1, wherein the first console comprises a monitor for viewing by a passenger when seated in the first seat and the table is arranged to be inserted within said first console at a position beneath the monitor.

5. An aircraft seat arrangement according to claim 4, wherein the first console comprises stowage space vertically located between the monitor and the table when stowed.

6. An aircraft seat arrangement according to claim 1, wherein the first console includes a foot-well and the first seat is convertible into a bed-mode in which the feet of a passenger when lying on the first seat would extend into the foot-well.

7. An aircraft seat arrangement according to claim 1, wherein the first console includes an upper surface usable by a passenger when seated in the second seat.

8. An aircraft seat arrangement according to claim 1, wherein the first console includes a stowage space for use by a passenger when seated in the second seat.

9. An aircraft seat arrangement according to claim 1, wherein the first console includes a first arm rest portion, which is located to one side of the second seat for use by a passenger when seated in the second seat and the aircraft seat arrangement also includes a second arm rest portion on the other side of the second seat for use by the passenger when seated in the second seat, wherein the first console includes a step between the first arm rest portion and the rest of the upper surface of the first console and the height of the first arm rest portion is substantially the same as the height of the second arm rest portion.

10. An aircraft seat arrangement according to claim 1, wherein the first console includes a first arm rest portion, which is located to one side of the second seat for use by a passenger when seated in the second seat and the aircraft seat arrangement also includes a second arm rest portion on the other side of the second seat for use by the passenger when seated in the second seat, wherein the first console includes a central upper surface which is substantially the same height as the height of the first arm rest portion, whereas the height of the first arm rest portion is significantly higher than the height of the second arm rest portion.

11. An aircraft seat arrangement according to claim 1, wherein
the table is arranged for movement to a first deployed position, in which a first portion of the table is accommodated within the first console, and a second portion of the table is positioned aft of the first console, such that the table provides a usable table space, having a first area, for use by a passenger when seated in the first seat,
the table is arranged for movement to a second deployed position, in which at least part of said first portion of the table is positioned outside of the first console, such that the table provides a usable table space, having a second area, for use by a passenger when seated in the first seat, the second area being larger than the first area, and
the table is arranged to be configured in a third deployed position, in which the table provides a usable table space, having a third area, for use by a passenger when seated in the first seat, the third area being larger than the second area.

12. An aircraft seat arrangement according to claim 1, wherein the table includes at least one table leaf arranged to be deployed to increase the area of table space usable by a passenger when seated in the first seat.

13. An aircraft seat arrangement according to claim 1, wherein the table has between two and ten set deployed positions, such that when the table is located at a set position, a resistance to movement of the table to another set position is greater than a resistance to movement of the table to a set position when the table is located between successive set positions.

14. An aircraft seat arrangement according to claim 1, wherein the seat arrangement includes a third seat, a fourth seat, a third console, and a fourth console, such that
the third seat and the fourth console are located in the first row and
the fourth seat and the third console are located in the second row,
and wherein
each of the first console and the third console have a foot-well,
the first seat is convertible into a bed-mode in which the feet of a passenger when lying on the first seat would extend into the foot-well of the first console,
the third seat is convertible into a bed-mode in which the feet of a passenger when lying on the third seat would extend into the foot-well of the third console, and
the foot-well of the first console has a width that is substantially identical to the corresponding width of the foot-well of the third console.

15. An aircraft seat arrangement according to claim 1, wherein, in the deployed position, the table extends over a top of a passenger's legs when the passenger is seated in the first seat.

16. A method of using a table in an aircraft, wherein the method includes the following steps:
providing an aircraft seat arrangement according to claim 1,
pulling a table horizontally out from within the first console to a position in which the passenger can use the table, and
pushing the table horizontally back into the first console.

17. A method of using a table in an aircraft according to claim 16, wherein
pulling the table horizontally out from within the first console to the position in which the passenger can use the table includes using the table in a first set configuration, in which the table presents a first area of useable table-space,
pushing the table horizontally back into the first console is performed such that there is substantially no useable table-space presented,
and wherein the method further comprises
using the table in a second set configuration, in which the table presents a second area of useable table-space, and
using the table in a third set configuration, in which the table presents a third area of useable table-space,
and wherein
the third area is larger than the second area, and the second area is larger than the first area.

18. An aircraft seat arrangement comprising
a first seat in a first row,
a second seat in a second row, the second row being located forward of the first row,
a first console located in the second row and being in front of the first seat, the first console being located adjacent to the second seat, and
a second console located in the first row and being adjacent to the first seat, said second console being directly aft of said second seat,
whereby the first and second consoles and the first and second seats are in a staggered arrangement, and
the aircraft seat arrangement further comprises
a table housed by said first console, wherein
the table is arranged for movement to a stowed position, in which the table is inserted within said first console,
the table is arranged for movement to a deployed position, in which the table is positioned aft of the first console so as to be suitable for use by a passenger when seated in the first seat, and
the first console includes a first arm rest portion, which is located to one side of the second seat for use by a passenger when seated in the second seat and the aircraft seat arrangement also includes a second arm rest portion on the other side of the second seat for use by the passenger when seated in the second seat, wherein the first console includes at least one of (i) a step between the first arm rest portion and the rest of the upper surface of the first console and the height of the first arm rest portion is substantially the same as the height of the second arm rest portion and (ii) a central upper surface which is substantially the same height as the height of the first arm rest portion, whereas the height of the first arm rest portion is significantly higher than the height of the second arm rest portion.

19. An aircraft seat comprising
a first seat in a first row,
a second seat in a second row, the second row being located forward of the first row,
a first console located in the second row and being in front of the first seat, the first console being located adjacent to the second seat, and a second console located in the first row and being adjacent to the first seat, said second console being directly aft of said second seat,
whereby the first and second consoles and the first and second seats are in a staggered arrangement, and
the aircraft seat arrangement further comprises
a table housed by said first console, wherein
    the table is arranged for movement to a stowed position, in which the table is inserted within said first console,
    the table is arranged for movement to a deployed position, in which the table is positioned aft of the first console so as to be suitable for use by a passenger when seated in the first seat, and
in the deployed position, an upper surface of the table is horizontal.

20. An aircraft seat arrangement comprising
a first seat in a first row,
a second seat in a second row, the second row being located forward of the first row,
a first console located in the second row and being in front of the first seat, the first console being located adjacent to the second seat, and
a second console located in the first row and being adjacent to the first seat, said second console being directly aft of said second seat,
whereby the first and second consoles and the first and second seats are in a staggered arrangement, and
the aircraft seat arrangement further comprises
a table housed by said first console, wherein
    the table is arranged for movement to a stowed position, in which the table is inserted within said first console,
    the table is arranged for movement to a deployed position, in which the table is positioned aft of the first console so as to be suitable for use by a passenger when seated in the first seat, and
    the first console comprises at least one of (i) a monitor for viewing by a passenger when seated in the first seat and the table is arranged to be inserted within said first console at a position beneath the monitor and (ii) a foot-well and the first seat is convertible into a bed-mode in which the feet of a passenger when lying on the first seat would extend into the foot-well.

\* \* \* \* \*